(12) United States Patent
Bala et al.

(10) Patent No.: US 11,991,630 B2
(45) Date of Patent: May 21, 2024

(54) WTRU POWER SAVING IN ACTIVE TIME

(71) Applicant: InterDigital Patent Holdings, Inc., Wilmington, DE (US)

(72) Inventors: Erdem Bala, East Meadow, NY (US); Moon-Il Lee, Melville, NY (US); Janet A. Stern-Berkowitz, Little Neck, NY (US); Paul Mariner, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/374,393

(22) Filed: Sep. 28, 2023

(65) Prior Publication Data

US 2024/0031931 A1   Jan. 25, 2024

Related U.S. Application Data

(63) Continuation of application No. PCT/US2022/022758, filed on Mar. 31, 2022.

(Continued)

(51) Int. Cl.
*H04W 72/232* (2023.01)
*H04W 52/02* (2009.01)

(52) U.S. Cl.
CPC ... *H04W 52/0225* (2013.01); *H04W 52/0216* (2013.01)

(58) Field of Classification Search
CPC ......... H04W 52/0225; H04W 52/0216; H04W 52/0235; H04W 52/0209; H04L 5/0082;
(Continued)

(56) References Cited

U.S. PATENT DOCUMENTS

2022/0295401 A1* 9/2022 Lin ...................... H04L 5/0053
2023/0309115 A1* 9/2023 Zhou .................... H04W 76/20
(Continued)

OTHER PUBLICATIONS

3rd Generation Partnership Project (3GPP), R1-2100593, "On Enhancements to DCI-Based UE Power Saving During DRX Active Time", MediaTek Inc., 3GPP TSG RAN WG1 #104-e e-Meeting, Jan. 25-Feb. 5, 2021, 7 pages.

(Continued)

*Primary Examiner* — Walli Z Butt
(74) *Attorney, Agent, or Firm* — Condo Roccia Koptiw LLP

(57) ABSTRACT

A WTRU may be configured to receive, in a first search space (SS) group (SSG), a first downlink transmission. The first downlink transmission may comprise first configuration information associated with power saving and downlink transmission monitoring. The WTRU may be configured to monitor for a second downlink transmission based on the first configuration information. On a condition that the first configuration information indicates a first value, the WTRU may be configured to monitor in the first SSG. On a condition that the first configuration information indicates a second value, the WTRU may be configured to monitor in a second SSG. On a condition that the first configuration information indicates a third value, the WTRU may be configured to skip downlink transmission monitoring in the first SSG for a first interval and monitor in the first SSG. The WTRU may receive the second downlink transmission based on the first configuration information.

18 Claims, 10 Drawing Sheets

Related U.S. Application Data

(60) Provisional application No. 63/292,076, filed on Dec. 21, 2021, provisional application No. 63/228,888, filed on Aug. 3, 2021, provisional application No. 63/185,573, filed on May 7, 2021, provisional application No. 63/170,177, filed on Apr. 2, 2021.

(58) Field of Classification Search
CPC ... H04L 5/001; H04L 5/0026; H04L 27/2602; H04L 5/0091; H04L 5/0053; Y02D 30/70
See application file for complete search history.

(56) References Cited

U.S. PATENT DOCUMENTS

| | | | | |
|---|---|---|---|---|
| 2023/0354364 | A1* | 11/2023 | Guo | H04W 52/0229 |
| 2023/0397224 | A1* | 12/2023 | Lai | H04W 52/0216 |

OTHER PUBLICATIONS

3rd Generation Partnership Project (3GPP), R1-2101476, "DCI-Based Power Saving Adaptation During DRX Active Time", Qualcomm Incorporated, 3GPP TSG-RAN WG1 #104-e e-Meeting, Jan. 25-Feb. 5, 2021, pp. 1-4.

3rd Generation Partnership Project (3GPP), R1-2101894, "FL Summary#2 of Power Saving for Active Time", Moderator (Vivo), 3GPP TSG RAN WG1 Meeting #104-e e-Meeting, Jan. 25-Feb. 5, 2021, pp. 1-55.

3rd Generation Partnership Project (3GPP), TS 36.321 V16.0.0, "Technical Specification Group Radio Access Network, Evolved Universal Terrestrial Radio Access (E-UTRA), Medium Access Control (MAC) Protocol Specification (Release 16)", Mar. 2020, pp. 1-141.

3rd Generation Partnership Project (3GPP), TS 36.331 V16.0.0, "Technical Specification Group Radio Access Network, Evolved Universal Terrestrial Radio Access (E-UTRA), Radio Resource Control (RRC), Protocol Specification (Release 16)", Mar. 2020, pp. 1-1048.

3rd Generation Partnership Project (3GPP), TS 38.211 V16.0.0, "Technical Specification Group Radio Access Network, NR, Physical Channels and Modulation (Release 16)", Dec. 2019, pp. 1-129.

3rd Generation Partnership Project (3GPP), TS 38.212 V16.0.0, "Technical Specification Group Radio Access Network, NR, Multiplexing and Channel Coding (Release 16)", Dec. 2019, pp. 1-145.

3rd Generation Partnership Project (3GPP), TS 38.213 V16.0.0, "Technical Specification Group Radio Access Network, NR, Physical Layer Procedures for Control (Release 16)", Dec. 2019, pp. 1-146.

3rd Generation Partnership Project (3GPP), TS 38.214 V16.0.0, "Technical Specification Group Radio Access Network, NR, Physical Layer Procedures for Data (Release 16)", Dec. 2019, pp. 1-147.

* cited by examiner

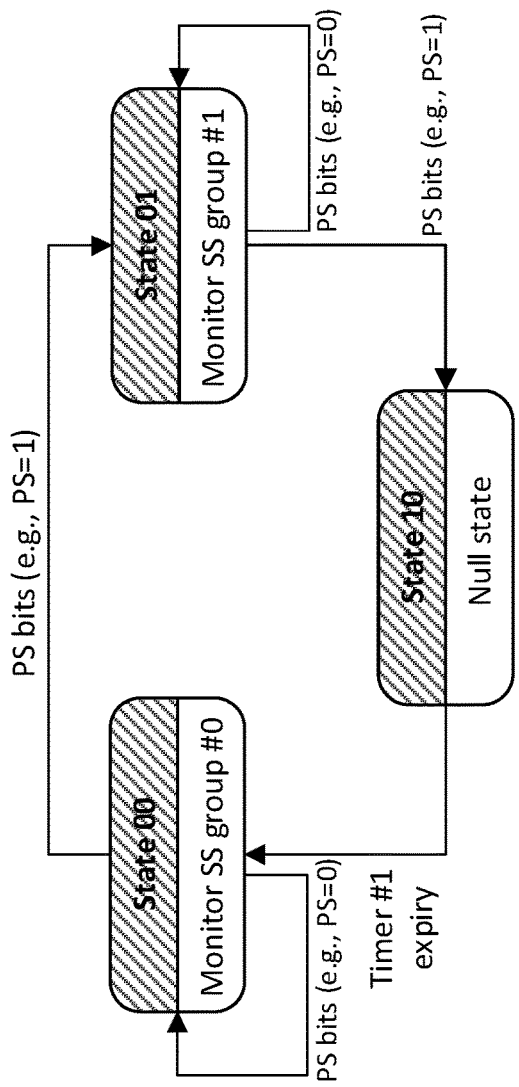
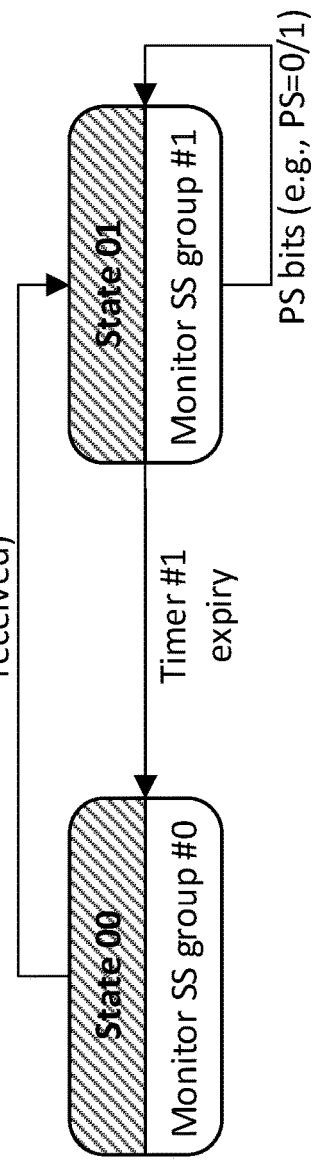
FIG. 6
FIG. 7

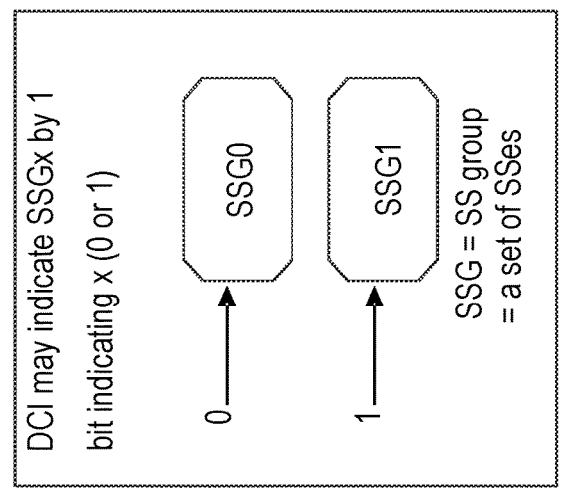
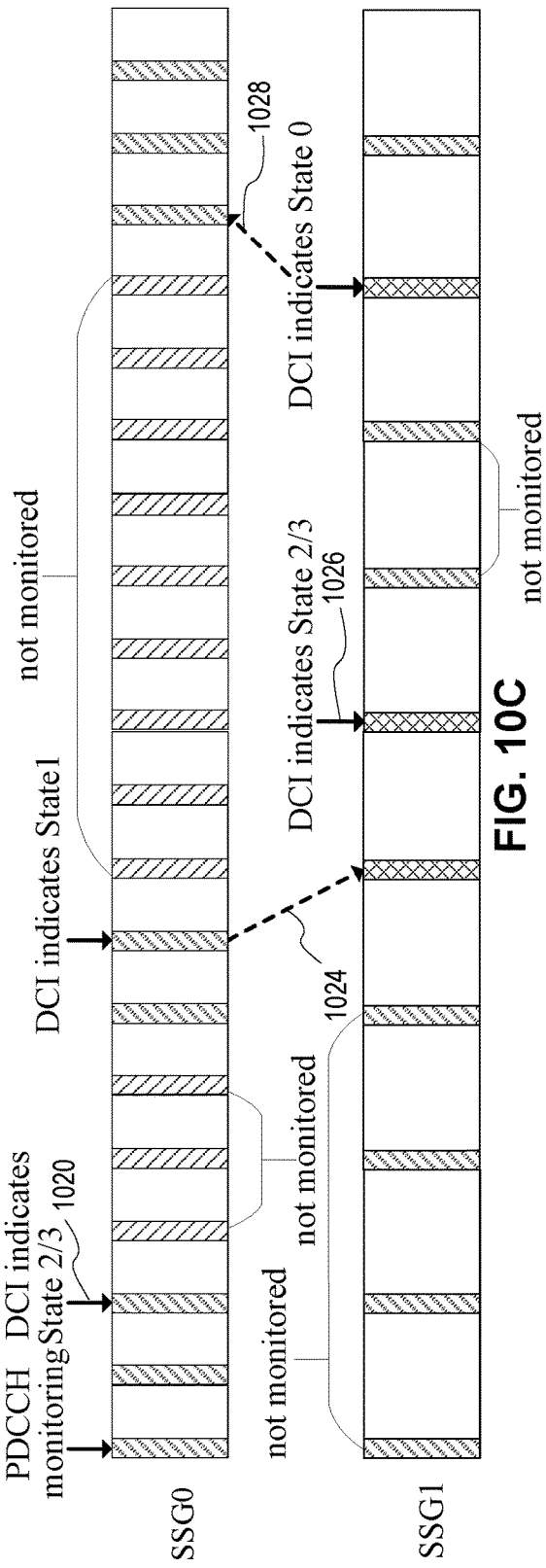
FIG. 10A
FIG. 10B
FIG. 10C

WTRU POWER SAVING IN ACTIVE TIME

CROSS-REFERENCE TO RELATED APPLICATIONS

This application filed under 35 U.S.C. § 111 is a continuation of and claims the benefit, under 35 U.S.C. § 365, of Patent Cooperation Treaty Application No. PCT/US2022/022758, filed Mar. 31, 2022, which claims the benefit of Provisional U.S. Patent Application No. 63/170,177, filed Apr. 2, 2021; Provisional U.S. Patent Application No. 63/185,573, filed May 7, 2021; Provisional U.S. Patent Application No. 63/228,888, filed Aug. 3, 2021; Provisional U.S. Patent Application No. 63,292,076, filed Dec. 21, 2021, which is incorporated herein by reference as if fully set forth.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities are disclosed herein for wireless transmit-receive unit (WTRU) power saving in active time. A WTRU may comprise a processor configured to perform one or more actions. The processor may be configured to receive, in a first search space (SS) group (SSG), a first downlink transmission. The first downlink transmission may comprise first configuration information associated with power saving. The first configuration information may be associated with downlink transmission monitoring. The processor may be configured to monitor for a second downlink transmission based on the first configuration information. On a condition that the first configuration information indicates a first value, the processor may be configured to monitor, in the first SSG, for the second downlink transmission. On a condition that the first configuration information indicates a second value, the processor may be configured to monitor, in a second SSG, for the second downlink transmission. On a condition that the first configuration information indicates a third value, the processor may be further configured to skip downlink transmission monitoring in the first SSG for a first interval and, in response to the first interval ending, monitor, in the first SSG, for the second downlink transmission. The processor may be configured to receive the second downlink transmission based on the first configuration information.

BRIEF DESCRIPTION OF THE DRAWINGS

FIG. 6 is a diagram illustrating an example of more than two states including a null state.

FIG. 7 is a diagram illustrating an example of state transition based on implicit indication.

FIGS. 10A-100 illustrate an example switching and PDCCH monitoring skipping.

DETAILED DESCRIPTION

Figure 1A:
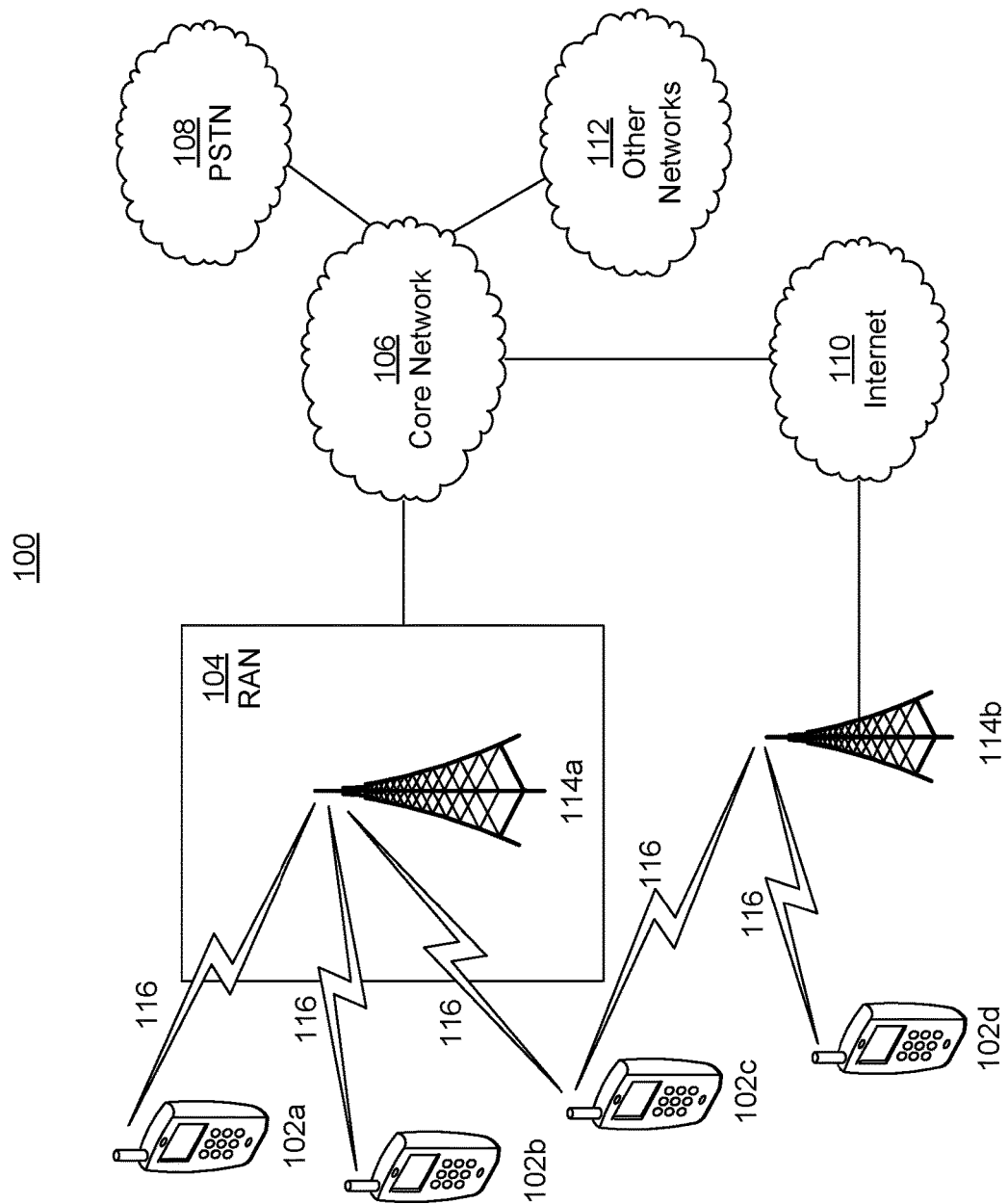
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c, and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (Vol P) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
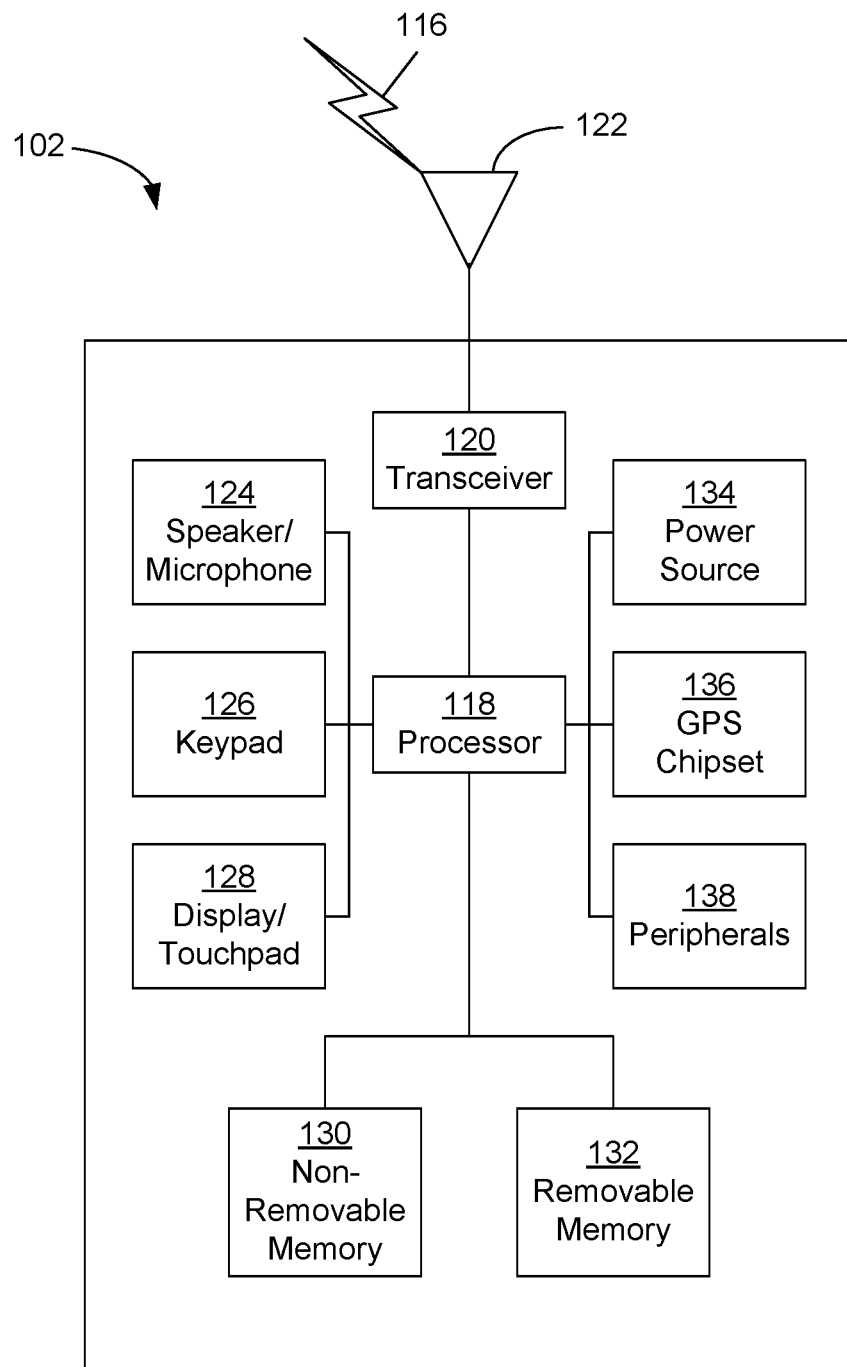
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
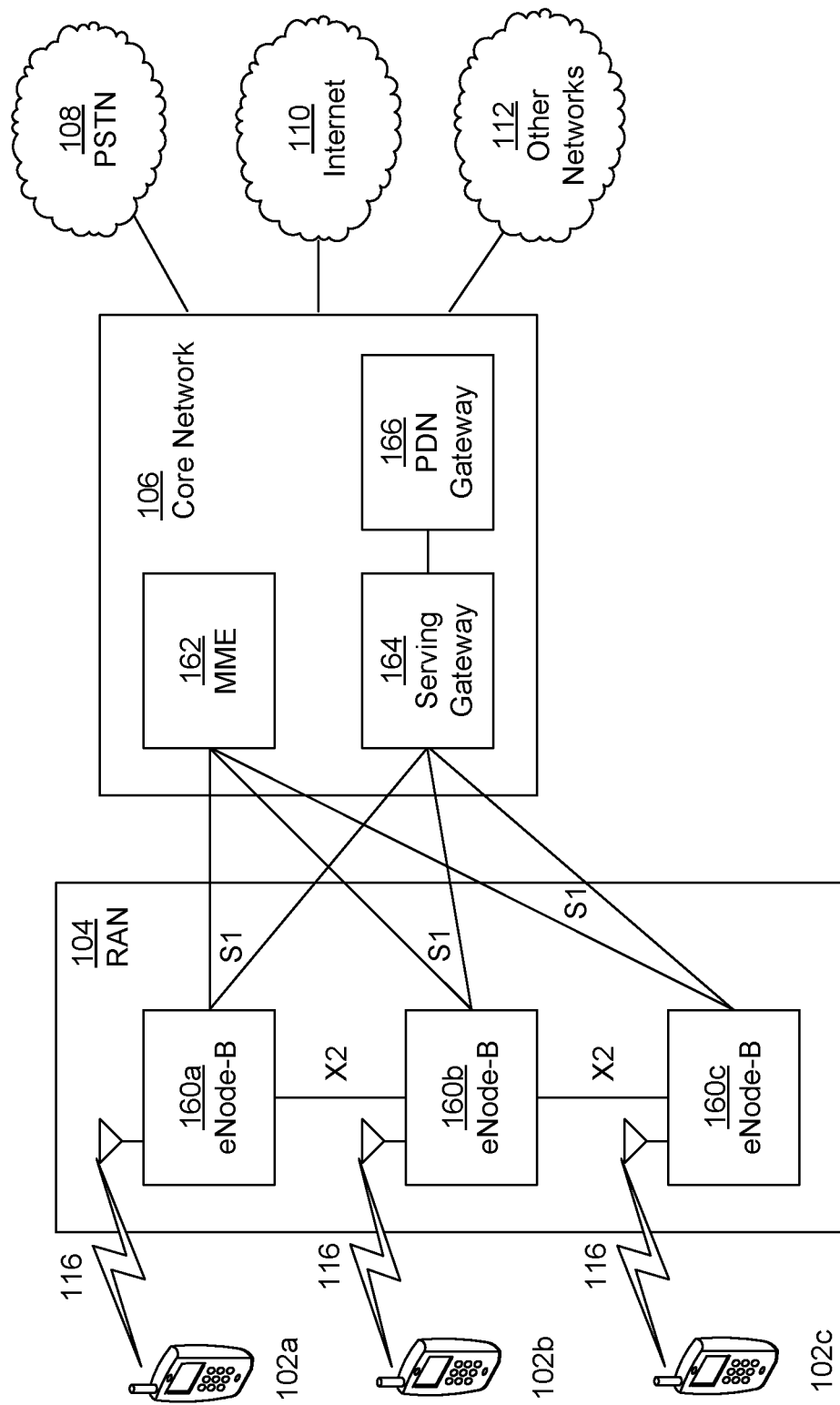
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
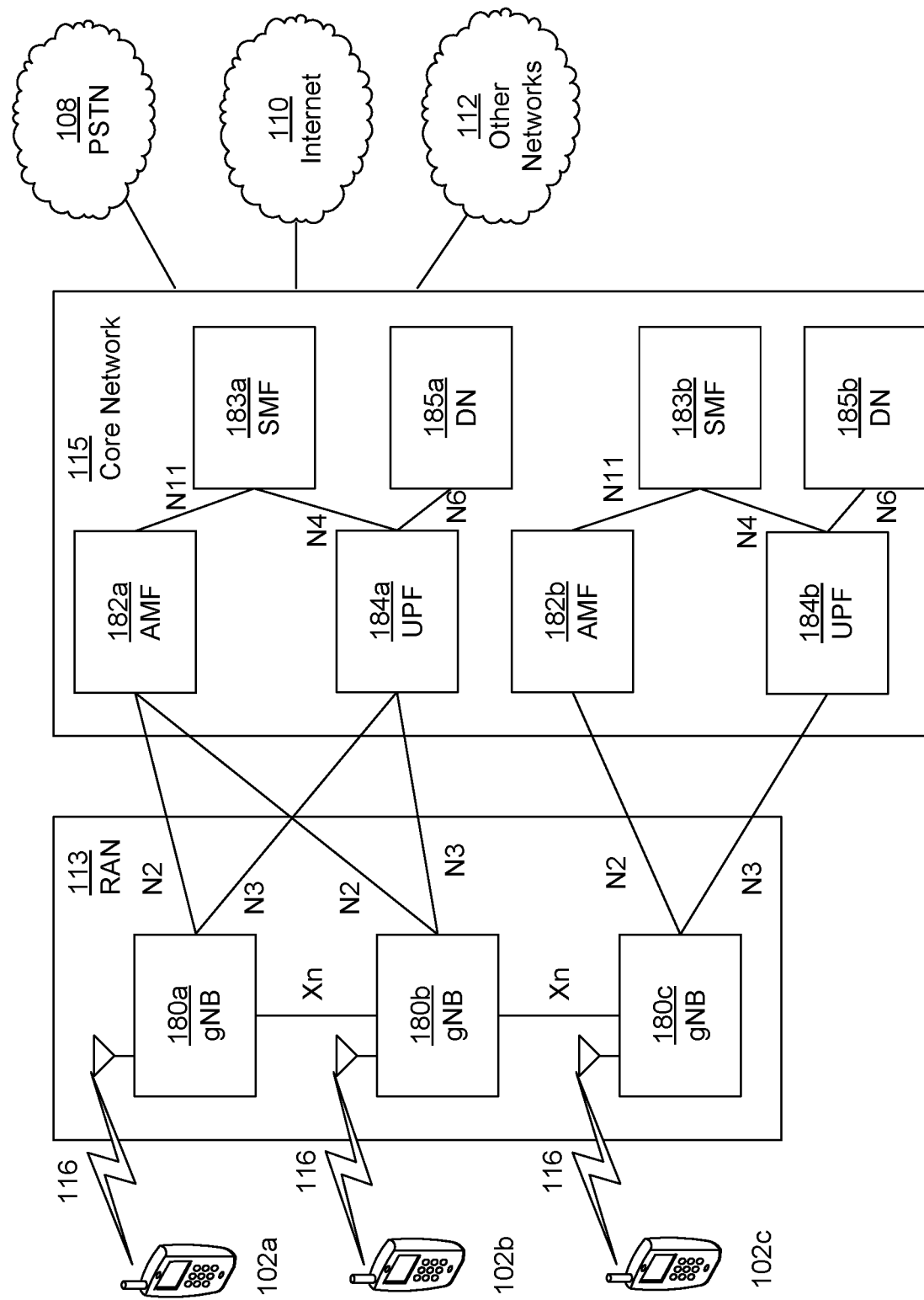
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are described herein for a wireless transmit-receive unit (WTRU) configured to save power in active time. The WTRU may be configured to interpret one or more power saving bits in a downlink control information (DCI) (e.g., an indication of search space group switching and/or physical downlink control channel (PDCCH) skipping), for example, based on a WTRU state. The WTRU may be configured to receive a DCI via a PDCCH transmission. The DCI may include one or more power saving bits. The one or more power saving bits may include a power saving indication. The WTRU may determine a power saving action to be performed by the WTRU based on the power saving indication.

The WTRU may be configured to switch from a first search space group to a second search space group and monitor for a downlink transmission in accordance with the second search space group, for example, if the WTRU determines that the power saving action to be performed is switching to the second search space group.

The WTRU may be configured to skip monitoring for the downlink transmission in accordance with the first search space group, for example, if the WTRU determines that the power saving action to be performed is skipping monitoring for the downlink transmission.

The WTRU may be configured to handle retransmission and scheduling request handling if the WTRU receives a PDCCH skipping request. Based on the received PDCCH scheduling request the WTRU may not perform PDCCH skipping or may monitor PDCCH according to a reduced set of search spaces in a time window. Based on the received PDCCH request, the WTRU may refrain from performing PDCCH skipping in a time interval. The time interval may be determined by one or more retransmission timers, for example. The WTRU may be configured to determine codepoint interpretation using an RRC configured parameter. The WTRU may be configured to terminate PDCCH skipping after SR transmission. The WTRU may be configured to indicate PDCCH monitoring for one or more secondary cells (SCells).

Discontinuous reception (DRX) may be used, for example, to conserve battery power. For example, during DRX, a WTRU may not monitor a downlink (DL) control channel, e.g., physical downlink control channel (PDCCH). A WTRU may use connected mode DRX (C-DRX), for example, in radio resource control (RRC) connected mode. An example of DRX is shown in the FIG. 2.

Figure 2:
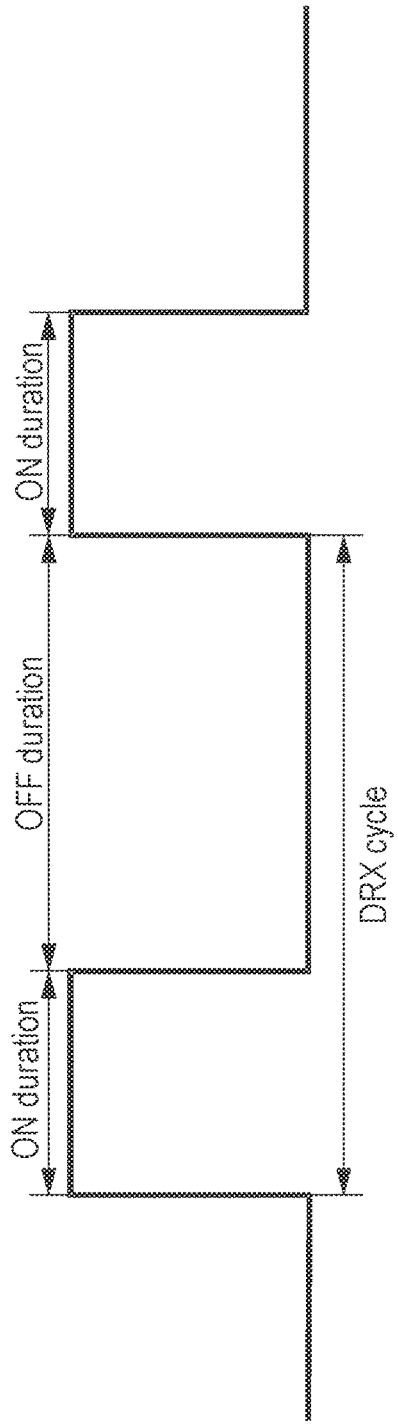
FIG. 2 is a diagram illustrating an example of ON and OFF durations in a DRX cycle.

FIG. 2 is a diagram illustrating an example of ON and OFF durations in a DRX cycle (e.g., to conserve battery power). A WTRU may monitor a (e.g., configured) channel (e.g., PDCCH) during an ON duration period and may sleep (e.g., not monitor the PDCCH) during an OFF duration. PDCCH is a non-limiting example of a channel (e.g., a control channel) that may be monitored or not monitored during a cycle. Channel and PDCCH may be used interchangeably in examples.

A DRX cycle may be a cycle (e.g., with an aperiodic repetition or a periodic repetition) of an ON duration and an OFF duration. A WTRU may monitor a channel (e.g., one or more channels, such as PDCCH) during an ON duration and may skip monitoring a channel (e.g., one or more channels, such as PDCCH) during an OFF duration. ON duration and DRX ON duration may be used interchangeably herein. OFF duration and DRX OFF duration may be used interchangeably herein.

In examples, a DRX cycle may be a short DRX cycle or a long DRX cycle. A WTRU may use a short DRX cycle for a period of time and/or a long DRX cycle for a period of time.

Reference to a timer herein may refer to determination of a time or determination of a period of time. Reference to a timer expiration herein may refer to determining that the time has occurred or that the period of time has expired. Reference to a timer herein may refer to a time, a time period, tracking the time, tracking the period of time, etc. Reference to a timer expiration herein may refer to determining that the time has occurred or that the period of time has expired.

A time, period of time, etc. may be determined (e.g., in terms of slot duration). The time may be a time after a PDCCH occasion in which a PDCCH (e.g., a successfully decoded PDCCH) may indicate an (e.g., initial) uplink (UL) or DL user data transmission. A DRX inactivity timer may indicate or may be used to determine the time. A DRX inactivity timer may be used, for example, to determine whether and/or when to transition to an OFF duration. DRX inactivity timer and inactivity timer may be used interchangeably herein.

A DRX ON duration may be a duration at the beginning of a DRX cycle.

A number of PDCCH occasions (e.g., consecutive PDCCH occasions) may be determined. The number of PDCCH occasions may be determined using an ON duration, e.g., an ON duration timer. The determined number of PDCCH occasions may be a number of PDCCH occasions that may be or may need to be monitored or decoded (e.g., by a WTRU), for example, after waking up from a DRX cycle and/or at the beginning of a DRX cycle.

A PDCCH occasion may be a time period that may include a PDCCH transmission, e.g., the PDCCH occasion may be a symbol, a set of symbols, a slot, or a subframe.

A DRX retransmission timer may be used to determine a number of (e.g., a consecutive number of) PDCCH occasion(s) to monitor, for example, if a retransmission may be expected by a WTRU. A DRX retransmission timer may be used to determine (e.g., may determine) a duration (e.g., a maximum duration) until a DL retransmission is received and/or a (e.g., maximum) duration until a grant for UL retransmission is received.

A DRX short cycle may be the first DRX cycle that a WTRU enters, e.g., after expiration of a DRX inactivity timer. A WTRU may be in a short DRX cycle, for example, until the expiration of a DRX short cycle timer. A WTRU may use a long DRX cycle, for example, if a DRX short cycle timer expires.

A DRX short cycle timer may be used to determine (e.g., may determine) a number of (e.g., a consecutive number of) subframe(s) that follow the short DRX cycle, e.g., after the DRX inactivity timer has expired.

A WTRU may monitor PDCCH and/or PDCCH occasions, for example, during an Active Time. An Active Time may occur, for example, during an ON duration. An Active Time may occur, for example, during an OFF duration. In examples, an Active Time may begin during an ON duration and may continue during an OFF duration. Active Time and Active Time of a DRX cycle may be used interchangeably herein.

An Active Time may include the time, e.g., if at least one of the following is true: (i) a DRX timer is running, e.g., wherein the DRX timer may be an ON duration timer, an inactivity timer, a retransmission timer (e.g., in a DL and/or UL retransmission), and/or a random access contention resolution timer; (ii) a scheduling request is sent (e.g., on a physical uplink control channel (PUCCH)) and may be pending; (iii) or a PDCCH transmission (e.g., indicating a new transmission addressed to a cell radio network temporary identifier (C-RNTI) of a medium access control (MAC) entity of a WTRU) has not been received (e.g., after successful reception of a Random Access Response for the Random Access Preamble not selected by the MAC entity among the contention-based Random Access Preamble).

A DRX timer may be a timer associated with DRX. In examples, one or more of the following timers may be associated with DRX: a DRX on duration timer (e.g., drx-onDurationTimer); a DRX inactivity timer (e.g., drx-InactivityTimer); a DRX DL retransmission timer (e.g., drx-RetransmissionTimerDL); a DRX UL retransmission timer (e.g., drx-RetransmissionTimerUL); a DRX hybrid automatic repeat request (HARQ) round trip time (RTT) timer for UL (e.g., drx-HARQ-RTT-TimerUL); or a DRX HARQ RTT timer for DL (e.g., drx-HARQ-RTT-TimerDL).

A DRX inactivity timer may be a duration after a PDCCH occasion, e.g., in which a PDCCH transmission indicates an initial UL or DL user data transmission for a MAC entity. A DRX DL retransmission timer (e.g., per DL HARQ process) may be a duration (e.g., a maximum duration), e.g., until a DL retransmission is received. A DRX UL retransmission timer (e.g., per UL HARQ process) may be a duration (e.g., a maximum duration), e.g., until a grant for UL retransmission is received. A DRX HARQ RTT timer for UL (e.g., per UL HARQ process) may be a duration (e.g., a minimum duration), e.g., before a UL HARQ retransmission grant may be expected by a WTRU or MAC entity. A DRX HARQ RTT timer for DL (e.g., per DL HARQ process) may be a duration (e.g., a minimum duration), e.g., before a DL assignment for HARQ retransmission may be expected by the WTRU or MAC entity.

A wake-up signal (WUS) and/or a go-to-sleep signal (GOS) (WUS/GOS) may be used, for example with a DRX operation. A WUS/GOS may be associated with one or more DRX cycles. A WUS/GOS may be transmitted and/or received, for example, prior to an associated time or part of a DRX cycle (e.g., an associated DRX cycle).

Figure 3:
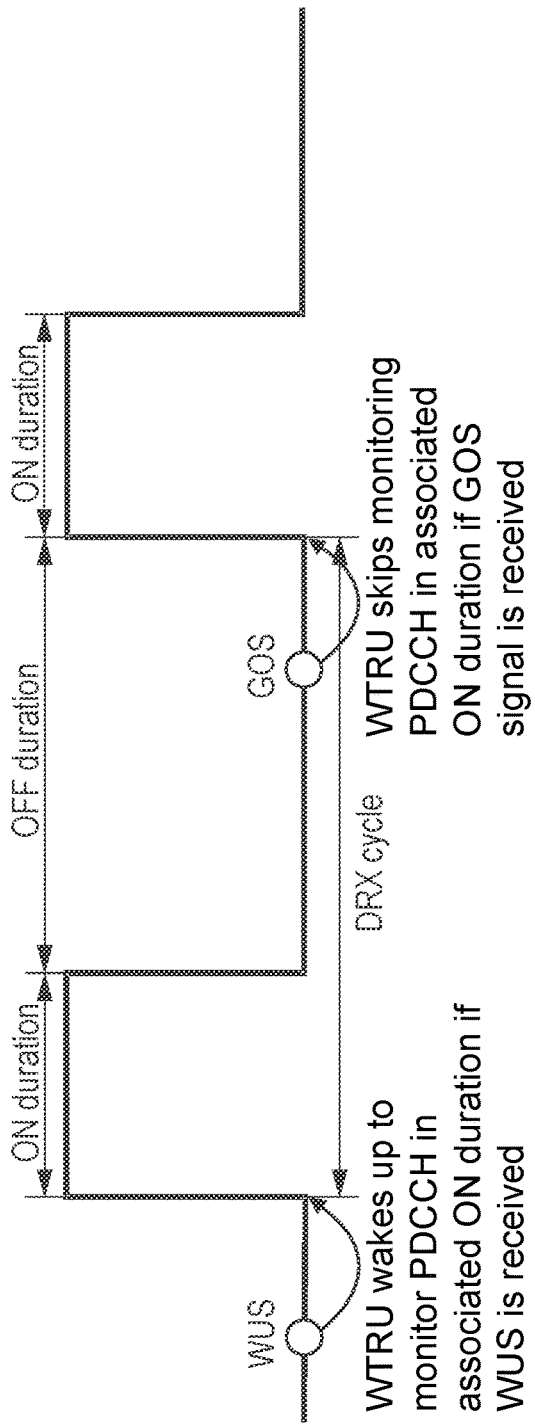
FIG. 3 is a diagram illustrating an example of WUS and GOS in DRX operation.

FIG. 3 is a diagram illustrating an example of WUS and GOS used with a DRX operation. A WTRU may monitor for a PDCCH transmission in ON durations for one or more DRX cycles, for example, if a WTRU receives a wake-up indication. A WTRU may skip monitoring for a PDCCH transmission in ON durations for one or more DRX cycles and may stay in a sleep mode (e.g., a deep sleep mode), for example, if a WTRU receives a go-to-sleep or not-wake-up indication.

A WTRU may be configured to monitor downlink control information (DCI) (e.g., DCI Format 2_6), for example, in a common search space. For example, before an ON duration, a WTRU may be configured to monitor downlink control information in a common search space. A WTRU may receive an indication (e.g., a 1-bit flag, such as ps-WakeupOrNot), for example, to indicate whether the WTRU may or may not start an Active Time (e.g., indicated by a drx-onDurationTimer) for the next DRX cycle. A WTRU may not start an Active Time (e.g., indicated by a drx-onDurationTimer) for the next DRX cycle, for example, if the WTRU is not provided with an indication (e.g., 1-bit flag, such as ps-WakeupOrNot).

New radio (NR) PDCCH and search spaces may be provided (e.g., implemented). In examples, a resource element group (REG) may be a building block (e.g., a smallest building block) for a PDCCH. A REG may include 12 resource elements (REs) on an OFDM symbol in time and a resource block (RB) in frequency. In a REG, nine (9) resource elements (REs) may be used for control information and three (3) REs may be used for a demodulation reference signals (DM-RSs). Multiple REGs (e.g., 2, 3, or 6) (e.g., the REGs that are adjacent in time or frequency) may form a REG bundle. The REG bundle may be used, for example, with a precoder (e.g., a same precoder). The DM-RSs of the multiple REGs in the REG bundle may be used for channel estimation. In examples, six (6) REGs (e.g., in the format of 1, 2, or 3 REG bundles) may form a control channel element (CCE). The CCE may be the smallest possible PDCCH. A PDCCH may include one or more CCEs (e.g., 1, 2, 4, 8, or 16 CCEs). The number of CCEs associated with a PDCCH may be referred to as an aggregation level (AL) of the PDCCH.

REG bundles may be mapped (e.g., using interleaving or non-interleaving mapping). In examples (e.g., for non-interleaving mapping), consecutive REG bundles (e.g., adjacent in frequency) may form a CCE. CCEs adjacent in frequency may form a PDCCH. In examples (e.g., using interleaving mapping), REGs may be interleaved (e.g., and/or permuted), for example, before being mapped to CCEs, which may result in (e.g., generally) non-adjacent REG bundles in a (e.g., one) CCE and non-adjacent CCEs in a (e.g., one) PDCCH.

A control resource set (CORESET) may be configured. A CORESET may comprise at least one of the following: (i) a frequency assignment (e.g., as chunks of multiple RBs, such as 6 RBs); (ii) a length in time (e.g., one or more, such as 1-3, OFDM symbols); (iii) a type of REG bundle; or (iv) a type of mapping from REG bundles to CCEs (e.g., interleaving mapping or non-interleaving mapping). In a bandwidth part (BWP), there may be up to N (e.g., 3) CORESETs. For example, there may be 12 CORESETs in four (4) possible bandwidth parts.

A WTRU may monitor a set of PDCCH candidates or may be assigned with a set of PDCCH candidates (e.g., to monitor). A set of PDCCH candidates may be monitored, for example, during a blind detection of PDCCH. A search space or a set of search spaces (e.g., for multiple aggregation levels) may be or may include a set of PDCCH candidates (e.g., to monitor, such as with blind detection). A search space, each search space, or set of search spaces may be configured, for example, by at least one of the following: (i) an associated CORESET; (ii) a number of candidates for or within each aggregation level; or (iii) a set of monitoring occasions. Monitoring occasions may be determined, for example, by one or more of the following: a monitoring periodicity (e.g., in terms of slots), a monitoring offset, or a monitoring pattern (e.g., with multiple bits (e.g., 14 bits) corresponding to the possible patterns of symbols inside a slot).

A function that may contribute to WTRU power consumption may be control channel monitoring during active time (e.g., for control channels, such as PDCCH and sidelink control channel). A WTRU may wake up and perform one or more procedures (e.g., channel estimation, channel decoding, demodulation, etc.), for example, to detect one or more PDCCH monitoring candidates in a PDCCH monitoring occasion. Such procedures (e.g., performed by a WTRU) may cause power consumption, which may increase, for example, if the procedure(s) are performed frequently (e.g., every slot) and/or if the number of PDCCH candidates is large. A WTRU may be enabled (e.g., configured) to save power (e.g., battery power), for example, while monitoring control channel candidates.

A WTRU may reduce PDCCH monitoring, for example, by (i) skip monitoring for a PDCCH transmission (e.g., not monitoring a PDCCH transmission in one or more time instances according to a set of search spaces), and/or (ii) switching between different search space groups, for example, based on traffic conditions. One or more features may be used for reducing PDCCH monitoring by skipping PDCCH monitoring and switching search space groups may be provided. PDCCH monitoring skipping and PDCCH skipping may be used interchangeably herein.

A state may be defined as a set of conditions a WTRU may apply or may be in, e.g., if it is monitoring for a PDCCH transmission. For example, a state's definition may include a set of search spaces (e.g., a search space group), which may be a set of search spaces according to which the WTRU monitors for the PDCCH transmission. Search spaces (SS), which may be configured for a bandwidth part (BWP), may be grouped into two groups as SS group #0 and SS group #1. If the WTRU is monitoring for the PDCCH transmission according to SS group #0, the WTRU may be said to be in a first state (e.g., state 0). If the WTRU is monitoring for the PDCCH transmission according to SS group #1, the WTRU may be said to be in a second state (e.g., state 1). The number of states and search space groups are not limited to two and examples provided herein may be for illustration purposes.

A state may be (or may be said to be) associated with a subset of search space groups (e.g., a search space group). For example, if a WTRU is in a state, the WTRU may be expected to monitor a PDCCH transmission, e.g., according to an associated subset of search space groups. A state that is associated with an empty set of SSs may be referred to as a null state. If a WTRU is in a null state, the WTRU may not monitor for a PDCCH transmission (e.g., only monitoring one or more common search spaces and not monitoring WTRU-specific search spaces). One SS may be included in more than one SS group. The one SS may be associated to more than one state. A null state may not be associated with WTRU specific SSs (e.g., any WTRU specific SSs). A null state may be associated with at least one common SS.

State transition from a first state to a second state may be or may include switching from a first SS group associated to the first state to a second SS group associated to the second state. Switching from a first SS group to a second SS group may mean that a WTRU stops monitoring for a PDCCH transmission according to the SS(s) in the first SS group and starts monitoring for the PDCCH transmission according to the SS(s) in the second group. State transition and SS group switching may be used interchangeably.

A WTRU, which may be in a state, may receive an indication (e.g., explicitly or implicitly) to not to monitor for a PDCCH transmission (e.g., allowed to skip monitoring for a PDCCH transmission during a time interval). The duration of the time interval may be measured in terms of absolute time (e.g., in ms), slots, OFDM symbols, number of monitoring occasions, etc. The description of the duration of a time interval herein are not limited to the unit of time interval measurement used in the description and may apply to any suitable unit of time interval measurement (e.g., all the units of time measurement described herein).

A state transition may be triggered by an explicit or implicit indication. In examples, an explicit indication may be signaled in control information (e.g., a DCI) in a PDCCH transmission and/or via a MAC signaling (e.g., with a MAC control element (CE)). An implicit indication may be triggered, e.g., by reception of a transmission on a channel such as a PDCCH. A timer expiry may trigger a state transition.

A WTRU state (e.g., each state) may be associated with a timer. The timer may start or restart, e.g., if a WTRU enters the state. A WTRU may exit a state, e.g., in response to expiry of a timer. In response to timer expiry, A WTRU may transition into a state (e.g., a new state) that may be a previous state the WTRU was in, a pre-configured state (e.g., a null state or a default state), or a state that may be determined using a specific rule.

A timer for a state may be configured (e.g., independently) and/or determined (e.g., independently). For example, a first timer may be used for a first state and a second timer may be used for a second state, e.g., wherein the first timer and the second timer are different.

A timer may be used or applied for a subset of states. For example, no timer may be used for a first state of a set of states (e.g., state 0) and a timer may be used for states other than the first state of the set of states.

A unified SS switching and PDCCH monitoring skipping indication may be implemented.

A WTRU may be configured with at least one control information format (e.g., a DCI or a format for other types of control information). At least one bit may be provided in the control information (e.g., a DCI). For example, at least one of the DCI formats 1_0, 1_1, 0_0, 0_1, 2_2, 2_6, etc. may be used, e.g., for the unified SS switching and PDCCH monitoring skipping indication. These bit(s) may be referred to as the power saving bits or PS bits herein. The PS bit(s) may indicate to the WTRU to trigger a state transition (e.g., a SS group switching, such as monitoring for a downlink control information transmission (e.g., a PDCCH transmission) in a different SS group) and/or may indicate to the WTRU to perform PDCCH monitoring skipping (e.g., to skip monitoring for a downlink control information transmission (e.g., a PDCCH transmission), e.g., in a current SS group). The PS bit(s) may indicate to the WTRU to stay in a current state (e.g., the current state is the state the WTRU is in when the DCI is received by the WTRU, wherein staying in the current state may mean monitoring for a downlink control information transmission (e.g., a PDCCH transmission) in a current SS group) and/or not perform PDCCH monitoring skipping (e.g., to continue monitoring for a downlink control information transmission (e.g., a PDCCH transmission), e.g., in a current SS group).

The PS bits may indicate to a WTRU to perform one or more of the following action(s) (e.g., in the case that the PS bits are received if the WTRU is in a first state): (i) move to another state (e.g., trigger a state transition); (ii) stay in the current state; (iii) perform PDCCH skipping according to a pre-configuration; (iv) not perform PDCCH skipping; or (v) a combination of state transition and PDCCH skipping, such as the WTRU may perform PDCCH skipping and move to another state or the WTRU may move to another state and perform PDCCH skipping. The action(s) described herein may be indicated/triggered implicitly (e.g., based on time expiry).

In examples, the PS bits may indicate to a WTRU to perform an action related to state transition (e.g., whether to move to another state or stay in the current state) and/or an action related to PDCCH skipping (e.g., whether to perform PDCCH skipping or not). The WTRU may determine an appropriate action to perform. For example, a DCI (e.g., the DCI received by the WTRU) may include a single PS bit. The WTRU may determine the PS bit to indicate to perform an action related to state transition. The WTRU may be in state 0. If the WTRU receives bit 0, the WTRU may stay in state 0. If the WTRU receives bit 1, the WTRU may move to state 1. The WTRU may be in state 1. If the WTRU receives bit 1, the WTRU may stay in state 1. If the WTRU receives bit 0, the WTRU may move to state 0.

The WTRU may determine the PS bit to indicate to perform an action related to PDCCH skipping in the current state. If the WTRU receives bit 0, the WTRU may stay in current state and not perform PDCCH skipping. If the WTRU receives bit 1, the WTRU may stay in current state and perform PDCCH skipping.

The WTRU may be configured with one or more parameters associated with an action indicated by the PS bit(s). In examples, the WTRU may be configured with possible skipping durations, e.g., to perform an action related PDCCH skipping. For example, in the case of using two bits (e.g., PS bits), the WTRU may be indicated to perform the following: 00: no skipping; 01: skip N slots; 10: skip M slots; or 11: skip until the end of the DRX cycle. If a null state is defined, then PDCCH skipping may be achieved, e.g., by indicating to the WTRU to move into the null state and stay in the null state for a time duration (e.g., a specific time duration).

The WTRU may use factors to determine an appropriate action (e.g., an action related to state transition or PDCCH skipping) as a result of the reception of the PS bits. The factors may include the state the WTRU is in when a DCI (e.g., the DCI containing the PS bits) is received, a configuration, a parameter, etc. The factors may include the state the WTRU is in at the time the DCI is received. In examples, in some states, the PS bits may indicate an action related to PDCCH skipping. In other states, the PS bits may indicate an action related to SS group switching.

Figure 4:
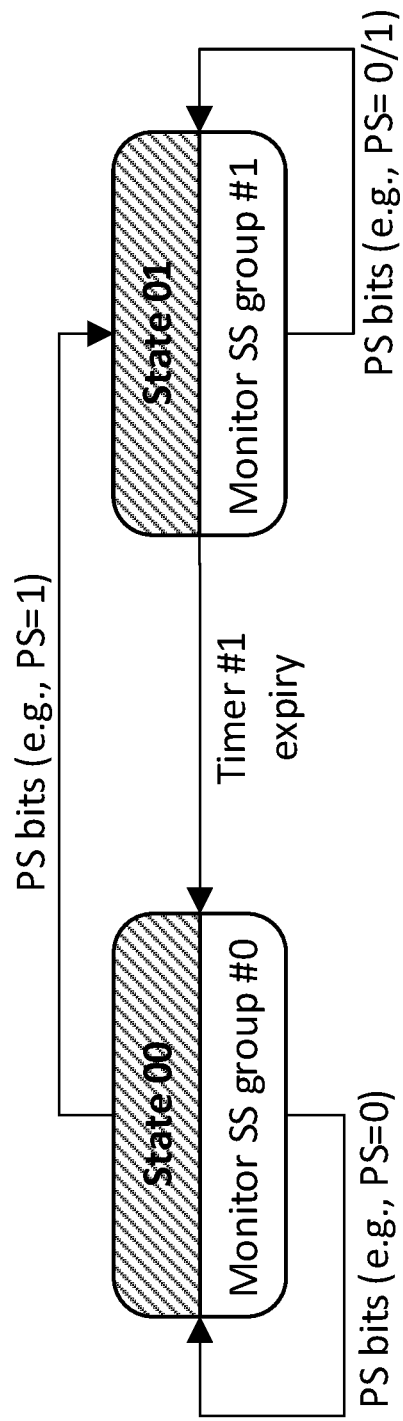
FIG. 4 is a diagram illustrating an example of a WTRU's state transition based on PS bits indication and/or timer expiry.

FIG. 4 is a diagram illustrating an example of a WTRU's state transition based on PS bits indication and/or timer expiry. In the example, the WTRU may be configured with two states (e.g., 00 and 01) and/or a DCI format with one or more PS bits. The PS bit(s) may be determined (e.g., by the WTRU) to trigger an action related to state transition, e.g., in the case that the PS bit(s) are received (e.g., if the WTRU is in state 00). The PS bit(s) may be determined (e.g., by the WTRU) to trigger an action related to PDCCH skipping, e.g., in the case that the PS bit(s) are received (e.g., if the WTRU is in state 01).

If the WTRU is in state 00, the WTRU may behave as follows. For example, if the WTRU is in state 00, the WTRU may be monitoring for a PDCCH transmission according to SS group #0. If the WTRU receives a DCI format configured with a PS bit, and the PS bit indicates (e.g., to the WTRU) to stay in the current state (e.g., to monitor for a PDCCH transmission according to SS group #0, and the PS bit is 0 (e.g., PS bit:0)), the WTRU may monitor for a PDCCH transmission according to SS group #0. If the WTRU is in state 00, the WTRU may be monitoring for a PDCCH transmission according to SS group #0. If the WTRU receives a DCI format configured with a PS bit, and the PS bit indicates (e.g., to the WTRU) to transition to state 01 (e.g., to monitor for a PDCCH transmission according to SS group #1, and the PS bit is 1 (e.g., PS bit:1)), the WTRU may transition to state 01 (e.g., the WTRU may start monitoring for the PDCCH transmission according to SS group #1). The WTRU may start a timer if the WTRU enters state 01.

If the WTRU is in state 01, the WTRU may behave as follows. For example, if the WTRU is in state 01, the WTRU may be monitoring for a PDCCH transmission according to SS group #1. If the WTRU receives a DCI format configured with a PS bit, and the PS bit is set to 0, the WTRU may monitor a PDCCH transmission according to SS group #1.

If the WTRU is in state 01, the WTRU may be monitoring for a PDCCH transmission according to SS group #1. If the WTRU receives a DCI format configured with a PS bit, and the PS bit is set to 1, the WTRU may skip monitoring for the PDCCH transmission for a time duration (e.g., a specific time duration). The duration may be preconfigured.

The WTRU may transition from state 01 to state 00, e.g., in response to expiry of a timer (e.g., a timer associated with a state (e.g., state 01)). The timer may restart, for example, if a WTRU receives a PDCCH transmission (e.g., a PDCCH transmission with a grant for a transport block (e.g., a new transport block), or a DCI with a priority indicator (e.g., priority indicator=0)). A state (e.g., each state) may be configured with a timer. The timer may be activated, e.g., with a MAC CE and/or a DCI. Activation of a timer may mean that the WTRU is going to use the timer. In examples, the timer may start and/or may restart in response to an action (e.g., if the WTRU enters the state corresponding to the timer). The WTRU may perform actions (e.g., the necessary actions) if the timer expires. A timer that is not activated may mean that the timer is not used.

Whether a transition from a state to another state is triggered (e.g., achieved) by an explicit signaling (e.g., via a DCI) and/or an implicit signaling (e.g., in response to reception of a PDCCH transmission) and/or another method (e.g., a timer expiry), may be configured and/or specified by a rule. For example, in FIG. 4, a transition from state 00 to state 01 may be triggered (e.g., achieved) by a DCI. A transition from state 01 to state 00 may be triggered (e.g., achieved) by timer expiry. If the DCI is not configured with the PS bit, a transition from state 00 to state 01 may be triggered (e.g., achieved) by implicit methods described herein (e.g., the WTRU receiving a PDCCH transmission).

Figure 5:
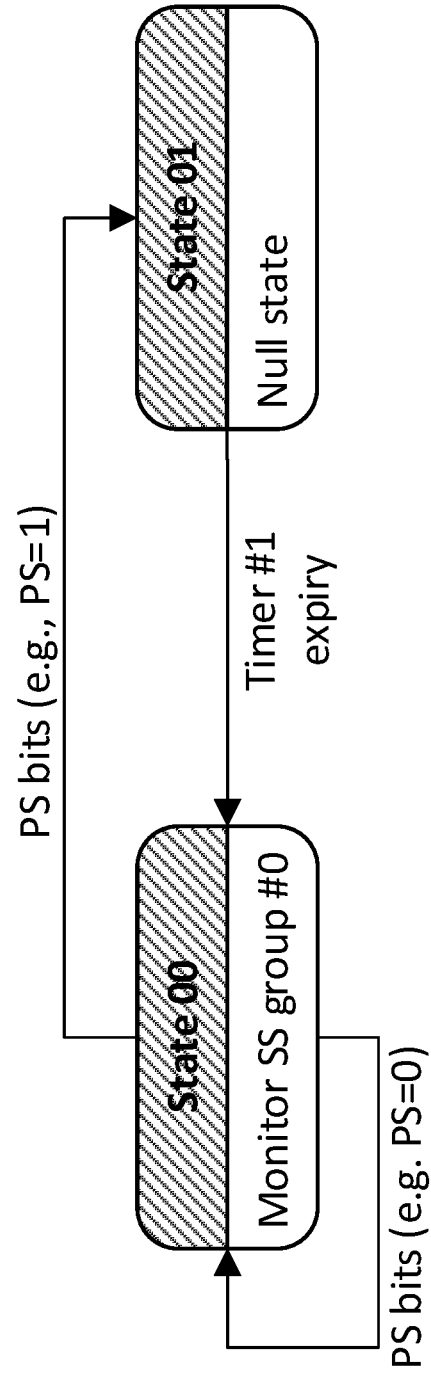
FIG. 5 is a diagram illustrating an example of using a null state for PDCCH skipping.

FIG. 5 is a diagram illustrating an example of using a null state for PDCCH skipping. As shown in FIG. 5, if in a null state, the WTRU may not be expected to monitor for a PDCCH transmission (e.g., the WTRU may not receive an indication within a DCI if in the null state).

FIG. 6 is a diagram illustrating an example of more than two states including a null state. As shown in FIG. 6, state transitions may be restricted to certain cases (e.g., only certain cases) and these transitions may be triggered by explicit or implicit signaling. A same bit in different states may trigger a different transition. For example, in state 00, bit 1 may indicate transition to state 01; and in state 01, bit 1 may indicate transition to state 10. A transition from state 10 may be to state 00, state 01, or another state as described herein. From a state, a WTRU may be configured with and/or may determine a set of states the WTRU may move into. As shown in FIG. 6, from state 00, the WTRU may move to state 01 (e.g., only state 01). If there are more than one state a WTRU may move into, then more than 1 bit may be used.

FIG. 7 is a diagram illustrating an example of state transition based on implicit indication. As shown in FIG. 7, SS group switching may be triggered by an implicit signaling and/or timer expiry. PDCCH skipping may be triggered with PS bits.

If a WTRU is in state 00, the WTRU may behave as follows. For example, if the WTRU is in state 00, the WTRU may monitor a PDCCH transmission according to SS group #0. If the WTRU receives a PDCCH transmission, the WTRU may perform transition to state 01. A timer may be started.

If the WTRU is in state 01, the WTRU may behave as follows. For example, if the WTRU is in state 01, the WTRU may be monitoring a PDCCH transmission according to SS group #1. if the WTRU receives a DCI format configured with the PS bit(s) (e.g., PS:0), the WTRU may monitor a PDCCH transmission according to SS group #1. For example, if the WTRU is in state 01, the WTRU may be monitoring for a PDCCH transmission according to SS group #1. If the WTRU receives a DCI format configured with the PS bit(s) (e.g., PS:1), the WTRU may skip monitoring the PDCCH transmission for a duration (e.g., a specific duration). The duration may be preconfigured. The WTRU may exit state 01 in response to a timer expiry.

In examples, a WTRU may switch into SS group 1 in response to that a DRX ON duration timer starts. The WTRU may monitor for a PDCCH transmission according to SS group 1, e.g., during the ON duration. The WTRU may start an associated timer, e.g., if the WTRU is in this state (e.g., state 1). If the WTRU receives a PDCCH transmission before the ON duration time expires, the WTRU may start or restart an associated timer. If the associated timer expires, the WTRU may move to state 0. If a PDCCH transmission is received while the WTRU is in state 0, the WTRU may transition to state 1 and may start the associated timer. DCI bits may indicate skipping if the DCI bits are received.

In examples, SS group switching and/or PDCCH skipping may be indicated by one or more of the following. SS group switching and/or PDCCH skipping may be indicated by a number of states (e.g., a number of SS groups configured).

If there is one (e.g., only one) group configured, the PS bits may indicate an action related to PDCCH skipping. For example, 0 may indicate no skipping; and 1 may indicate skipping. SS group switching and/or PDCCH skipping may be indicated by CORESET. For example, bits in a DCI/PDCCH transmission (e.g., a DCI in a PDCCH transmission) received in a first CORESET may indicate an action related to PDCCH skipping. For example, bits in a DCI/PDCCH transmission received in a second CORESET may indicate an action related to SS switching. SS group switching and/or PDCCH skipping may be indicated by a WTRU configuration. SS group switching and/or PDCCH skipping may be indicated by a radio network temporary identifier (RNTI). In examples, an interpretation of the PS bits may be determined with an RNTI used to scramble the PDCCH cyclic-redundancy check (CRC). The WTRU may interpret the PS bits to perform search space set switching (e.g., SS group switching), for example, if the CRC is scrambled with a first RNTI. The WTRU may interpret the PS bits to apply skipping, for example, if the CRC is scrambled with a second RNTI. One of the RNTUs may be equal to the C-RNTI. In examples, the WTRU may apply the skipping operation in the state in which the PS bits are received. SS group switching and/or PDCCH skipping may be indicated by a BWP type and/or a BWP ID. SS group switching and/or PDCCH skipping may be indicated by a DCI format (e.g., 2_2 vs 1_1 or 0_1). SS group switching and/or PDCCH skipping may be indicated by the SS in which the DCI is received. For example, if the WTRU receives the DCI in SS k in SS group M, then the bit may be interpreted as a state transition. if the WTRU receives the DCI in SS m in SS group M, then the bit may be interpreted as a skipping request. SS group switching and/or PDCCH skipping may be indicated by a MAC CE. SS group switching and/or PDCCH skipping may be indicated by a WTRU type and/or a WTRU category. SS group switching and/or PDCCH skipping may be indicated by DRX parameter(s) and/or a DRX type. For example, if short DRX is configured, the bits may be interpreted as for SS switching. Skipping may be limited to long DRX (e.g., long DRX only). The value(s) of DRX ON duration timer and/or the inactivity timer may provide an indication for SS group switching and/or PDCCH skipping.

One or more of following may apply for (e.g., trigger) an implicit indication. Reception activity of DCI with a priority indicator may apply for an implicit indication. For example, if a WTRU has not received a scheduling DCI with a priority indicator status (e.g., a certain priority indicator status, such as priority index=1) for longer than X slots (or ms) in a first state, the WTRU may switch to a second state for PDCCH monitoring (e.g., wherein X may be a time window or timer). The time window or the timer may reset if the WTRU receive a DCI with a priority indicator status (e.g., a certain priority indicator status, such as priority index=1) in a slot.

An implication indication may apply after a BWP switch. For example, a WTRU may monitor SS group #2 in a first BWP and the WTRU may switch to a second BWP. If the WTRU switches back to the first BWP, the WTRU may monitor SS group #1. A default SS group may be configured, pre-determined, and/or used for a BWP. If a WTRU switches to the BWP, the starting SS group for PDCCH monitoring may be the default SS group. A default SS group may be a SS group with a lowest SS group identity, a SS group associated with a first state (e.g., state 0), and/or configured per BWP. A default SS group may be determined based on the configuration of the search spaces in a SS group (e.g., each SS group). For example, an SS group which includes the shortest (or longest) SS monitoring occasions may be determined as a default SS group FIGS. 10A-10C illustrate an example switching and PDCCH monitoring skipping, as described herein In examples, the codepoints represented by the PS bits may be used by a WTRU to determine an indication (e.g., wherein the indication may be SS group switching and/or PDCCH skipping). In the case of n PS bits, there may be $2^n$ codepoints. For example, in the case of 2 PS bits, 4 codepoints may be represented: 00, 01, 10, and 11. These codepoints may indicate the following. In the case of two codepoints being used for SS groups switching, code point 00 may indicate that if the WTRU is in state 0 (e.g., see SS group 0 (SSG0) in FIGS. 10B and 10C), stay in current state (e.g., see 1004 in FIG. 10B); and if the WTRU in in state 1 (e.g., see SS group 1 (SSG1) in FIGS. 10B and 10C), switch to state 0 (e.g., see 1014 in FIG. 10B and 1028 in FIG. 10C). Code point 01 may indicate that if the WTRU is in state 1 (e.g., see SS group 1 (SSG1) in FIGS. 10B and 100), stay in current state (e.g., see 1008 in FIG. 10B); if the WTRU is in state 0 (e.g., see SS group 0 (SSG0) in FIGS. 10B and 10C), switch to state 1 (e.g., see 1006 in FIG. 10B and 1024 in FIG. 10C). In the case of two codepoints being used for PDCCH skipping, codepoint 10 may indicate to stay in current state and skip m1 slots (e.g., see 1002 and 1010 in FIG. 10B and 1022 and 1026 in FIG. 10C). Codepoint 11 may indicate to stay in current state and skip m2 slots (e.g., see 1016 and 1012 in FIG. 10B and 1020 and 1026 in FIG. 10C). The number of codepoints allocated to indicating SS group switching and PDCCH skipping may not be equal. One of the codepoints allocated to PDCCH skipping may indicate skipping until the end of a DRX cycle, and/or stopping an inactivity timer.

In examples, a codepoint may indicate to the WTRU to apply SS group switching and PDCCH skipping. For example, codepoint k mean indicate switch to state L and skip M slots in state L, and/or skip M slots in current state and then switch to state L.

In examples, the WTRU may be indicated, in the DCI (e.g., the same DCI that is used for indicating SS group switching), to apply a bandwidth part (BWP) switch. An index of a target SS group in the DCI may indicate the SS group to monitor in a target BWP, for example, if the WTRU is indicated to apply a SS group and BWP switch in the DCI (e.g., the same DCI). The WTRU may ignore the signaled index, for example, if the target BWP is not configured with a SS group with the indicated index. The target BWP may monitor a default SS group (e.g., the configured SSs), the configured SS groups, and/or the SS group with a specific index (e.g., the SS group with a lowest or highest index). Skipping may be applied in the target BWP (e.g., in response to the BWP switch), for example, if the WTRU is indicated in the DCI (e.g., the same DCI) to apply a BWP switch and to perform PDCCH skipping. Skipping may be applied in the target BWP and the index of the target SS group in the DCI may determine the SS group to monitor in the target BWP, for example, if the WTRU is indicated in the DCI (e.g., the same DCI) to apply a BWP switch and to perform SS group switching and PDCCH skipping.

In examples, the WTRU may be configured in the DCI with a first set of bits for SS group switching and a second set of bits for PDCCH skipping.

For example, one bit (e.g., bit 0) may be configured for SS group switching, and two bits (e.g., bits 1 and 2) may be configured for PDCCH skipping. The WTRU may stay in state 0, for example, if bit 0 is 0 and the WTRU is in state 0. The WTRU may move to state 1, for example, if bit 0 is 1 and the WTRU is in state 0. The WTRU may stay in state 1, for example, if bit 0 is 1 and the WTRU is in state 1. The WTRU may move to state 0, for example, if bit 0 is 0 and the WTRU is in state 1.

In examples, bits 1 and 2 may be configured for PDCCH skipping. For example, no PDCCH skip may be indicated, for example, if bit 1 is 0 and bit 2 is 0. Skip M1 slots (e.g., or another unit of time such as Mi monitoring occasions) may be indicated, for example, if bit 1 is 0 and bit 2 is 1. Skip M2 slots (e.g., or another unit of time such as M2 as monitoring occasions) may be indicated, for example, if bit 1 is 1 and bit 2 and 0. Skip until end of the DRX cycle may be indicated, for example, if bit 1 is 1 and bit 2 is 1.

The order of whether to apply SS group switching first and skipping second (e.g., or vice versa) may be configured and/or pre-determined based on a rule, for example, if the DCI indicated to the WTRU to apply SS group switching and skipping. For example, the order of the bits in the DCI may determine the order of the indication applied. For example, SS group switching may be applied before PDCCH skipping, for example, if the indices of the SS group switching bits in the DCI are less than the indices of the PDCCH skipping bits.

In examples, the WTRU may interpret the codepoint (e.g., determine the action indicated by the codepoint) based on the index of the SS group according to which PDCCH is being monitored if the DCI is received. For example, if a PDCCH transmission is monitored in state 0 and a DCI is received, the codepoint(s) may indicate to the WTRU one or more of the following: 00, which indicates to stay in current state; 01, which indicates to switch to state 1; 10, which indicates to stay in current state and skip m1 slots; or 11, which indicates to stay in current state and skip m2 slots.

In examples, if a PDCCH transmission is monitored in state 1 and a DCI is received, the codepoint(s) may indicate to the WTRU one or more of the following: 00, which indicates to not skip a PDCCH transmission; 01, which indicates to skip M1 slots (e.g., or another unit of time such as M1 monitoring occasions); 10, which indicates to skip M2 slots (e.g., or another unit of time such as M2 monitoring occasions); or 11, which indicates to skip until the end of a DRX cycle.

In examples, a search space group and/or an SS may be configured to be "non-switchable from" (e.g., via a parameter SwitchingFromAllowed that may take values true or false). If the WTRU is in that state (e.g., the non-switchable from state), the WTRU may not be indicated with explicit L1 signaling switch to another state and/or explicit signaling may indicate to the WTRU to perform PDCCH skipping (e.g., PDCCH skipping only). For example, codepoints (e.g., all codepoints) may be interpreted as indicating to perform skipping only. The WTRU may switch from this state by another technique other than explicit signaling, e.g., expiration of a duration of time, for example, via a timer expiry. In examples, SS group 1 may be configured as "non-switchable from."

In examples, an RRC configured parameter for an SS group and/or an SS may be used by the WTRU to determine how to interpret the codepoint(s) indicated by the DCI bits if the DCI is received while the WTRU is monitoring PDCCH according to that SS or SS group. For example, the codepoint(s) may indicate SS group switching (e.g., SS group switching only) or PDCCH skipping (e.g., PDCCH skipping only), or one or more of the codepoints may indicate SS group switching and one or more of the codepoints may indicate PDCCH skipping. For example, the parameter may take values switchingAllowed, skippingAllowed, and/or switchingAndSkippinAllowed. The codepoints may indicate switching, for example, if the parameter is switchingAllowed. The codepoints may indicate PDCCH skipping, for example, if the parameter is skippingAllowed. One or more codepoints may indicate PDCCH skipping and one or more codepoints may indicate SS group switching, for example, if the parameter is switchingAndSkippinAllowed.

SS group switching and/or PDCCH skipping may be applied in relation to DL retransmissions. In examples, a WTRU may receive a DCI with a downlink grant and the DCI may include an indication for the WTRU to perform PDCCH skipping. The WTRU may apply the indication in slot (e.g., a n+n_offset slot). For example, n may be a slot index in which the PDCCH transmission is received, and n_offset may be a configurable parameter in slots and may be a function of WTRU capability. The WTRU may apply the indication in the first symbol after the end of the corresponding transmission carrying the DL HARQ feedback.

In examples, the WTRU may choose not to apply PDCCH skipping in a duration (e.g., a time duration), e.g., to monitor a PDCCH transmission for possible retransmissions. The WTRU may monitor for a PDCCH transmission in the time duration, e.g., according to a set of SSs. The set of SSs may include one or more of the following. The set of SSs may include a preconfigured set of SSs (e.g., including a single preconfigured SS). The set of SSs may include a set of SSs selected by the WTRU from the group of SSs the WTRU was monitoring and/or the WTRU is expected to monitor at the time a DL grant is received. For example, the set may contain one or more SSs from the group with largest or smallest SS IDs. The set of SSs may be selected from the WTRU specific SSs (e.g., the WTRU specific SSs only). The set of SSs may include the SS according to which the downlink grant is received. The set of SSs may include the SS according to which the initial downlink grant is received (e.g., if the current grant is for a retransmission). The set of SSs may include a set of SSs selected by the WTRU from the set of all configured SSs for a BWP. For example, the set may include one or more SSs from the group with the largest or smallest SS IDs. The set of SSs may be selected from the WTRU specific SSs (e.g., the WTRU specific SSs only). The set of SSs may include a preconfigured set of SSs (e.g., including a single preconfigured SS), for example, wherein the set of SSs may be monitored within the duration. The WTRU may refrain from monitoring the set of SSs outside the duration.

In examples, the duration (e.g., the duration in which the WTRU may not to apply PDCCH skipping) may include the symbols and/or slots during which a corresponding drx-RetransmissionTimerDL timer or one of a corresponding drx-RetransmissionTimerDL timer and a drx-HARQ-RTT-TimerDL timer is running. The corresponding timers may be the timers that are used for the HARQ process of the downlink grant. The WTRU may monitor for a PDCCH transmission with a reduced set of SSs, e.g., if at least one drx-RetransmissionTimerDL timer corresponding to any HARQ process is running. The WTRU may monitor the PDCCH transmission with a reduced set of SSs, e.g., if at least one drx-RetransmissionTimerDL or at least one drx-HARQ-RTT-TimerDL corresponding to any HARQ process is running.

In examples, the WTRU may receive a DCI with a downlink grant and the DCI may include an indication for the WTRU to switch to a null state and the WTRU may start a timer, e.g., a null_state_timer. If the data of the corresponding HARQ process is not successfully decoded, the WTRU may switch to a state (e.g., a new state) from the null state and/or the null_state_timer may be stopped. The WTRU may stay in the new state, e.g., if any of the corresponding drx-RetransmissionTimerDL and/or drx-HARQ-RTT-TimerDL timers is running, or if the corresponding drx-RetransmissionTimerDL (e.g., only the corresponding drx-RetransmissionTimerDL) is running. The WTRU may stay in the new state, e.g., if at least one drx-RetransmissionTimerDL timer corresponding to any HARQ process is running. The WTRU may stay in the new state, e.g., if at least one drx-RetransmissionTimerDL or at least one drx-HARQ-RTT-TimerDL corresponding to any HARQ process is running. The new state may be a preconfigured state and/or the state in which the DL grant is received.

In examples, a WTRU may ignore a PDCCH skipping indication and/or a switching indication to another state (e.g., a null state) and may continue to monitor for a PDCCH transmission according to the configured SSs, e.g., if one or more of following conditions are met. One condition is that the data of the corresponding HARQ process is not successfully decoded. For example, if a WTRU sends a NACK for a HARQ process in a first state, the WTRU may not perform PDCCH skipping indication nor state switching indication, e.g., unless the WTRU finishes the corresponding transmission. For example, the WTRU may finish the corresponding transmission in response to that the WTRU successfully receives or sends ACK for the HARQ process. One condition is that a triggered aperiodic CSI reporting is not reported (e.g., yet). For example, a WTRU may be triggered to report an aperiodic CSI at slot n+k1. If the WTRU receives PDCCH skipping or state switching indication earlier than n+k1, the WTRU may perform PDCCH skipping or state switching after n+k1 (e.g., n+k1+1). One condition is that an associated HARQ reporting has not been performed. For example, if a WTRU receives a PDCCH transmission in a slot #n, a scheduled physical downlink shared channel (PDSCH) transmission in slot #n+k1, and its associated HARQ reporting in the slot #n+k2; the WTRU may not perform PDCCH skipping or state switching, e.g., until the WTRU reports HARQ in the slot #n+k2. One condition is that a WTRU is in a first mode of operation. For example, if a WTRU is in a first mode of operation (e.g., URLLC), the WTRU may not perform PDCCH skipping or state switching. If a WTRU is in a second mode of operation (e.g., eMBB), the WTRU may perform PDCCH skipping or state switching, e.g., if indicated or triggered. A WTRU may be in a first mode of operation, e.g., if the WTRU is configured with at least one of: a priority indicator in DCI format; a short-TTI (e.g., PDSCH or PUSCH scheduling less than a slot); or a sidelink operation.

Figure 8:
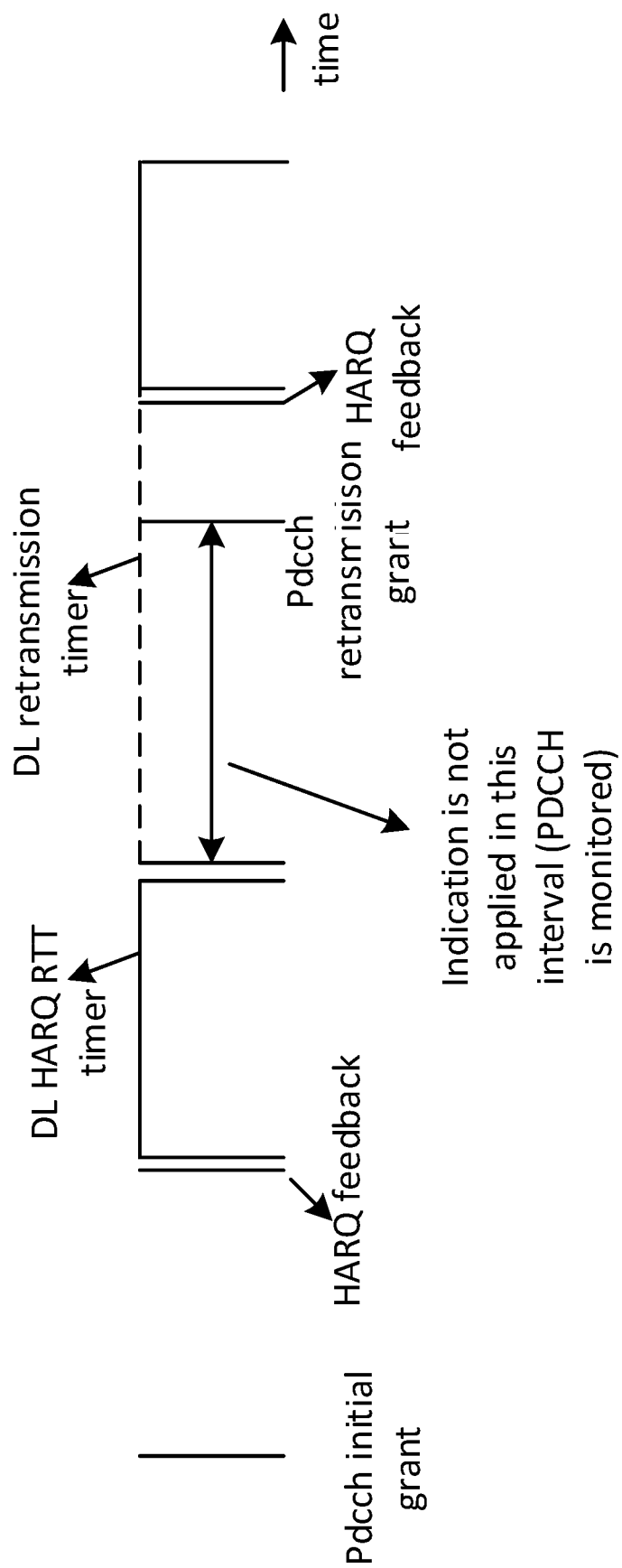
FIG. 8 is a diagram illustrating an example of a timeline for the downlink (DL) transmission of a corresponding HARQ process.

FIG. 8 is a diagram illustrating an example of a timeline for the DL transmission of a corresponding HARQ process. As shown, each vertical may represent an OFDM symbol, for example, wherein the OFDM symbol may be the last symbol of a transmission when applicable (e.g., the last symbol of the transmission carrying the DL HARQ feedback).

In DL transmission, a DRX HARQ timer (such as the drx-HARQ-RTT-TimerDL) for a HARQ process may be started in the first symbol in response to the end of the corresponding transmission carrying the DL HARQ feedback, and a DL retransmission timer (such as the drx-RetransmissionTimerDL timer) may be stopped. The drx-RetransmissionTimerDL timer for the corresponding HARQ process may be started in the first symbol in response to the expiry of the drx-HARQ-RTT-TimerDL timer, for example, if the drx-HARQ-RTT-TimerDL timer expires and the data of the corresponding HARQ process is not successfully decoded.

In examples, if the WTRU receives an indication not to monitor for a PDCCH transmission in a time interval (e.g., a skipping indication, an indication to switch to a null state, etc.) in an initial grant, the WTRU may apply the indication, for example, if the DL retransmission timer is not running. The WTRU may start applying the indication in the first symbol in response to that the transmission carrying the grant ends (e.g., in response to that the PDCCH transmission with the grant ends), for example, if the DL retransmission timer is running and the WTRU receives a PDCCH transmission with a DL transmission grant (e.g., a retransmission grant). In examples, the indication may not be applied in the interval from the first symbol when the DL retransmission timer is started until the last symbol of the transmission carrying the grant. In examples, the indication may not be applied in the interval from the first symbol when the DL retransmission timer is started until the last symbol of the transmission carrying the grant plus a time offset. The time offset may be configured and may be measured in terms of number of OFDM symbols and/or slots. In examples, the indication may not be applied in the interval from the first symbol when the DL retransmission timer is started until the end of the last symbol before the HARQ feedback transmission or until the end of the HARQ feedback transmission.

Although the timeline as shown in FIG. 8 is for a single DL HARQ process, multiple DL HARQ processes may be running in parallel. The WTRU may determine the applicable intervals for a DL HARQ process (e.g., each DL HARQ process), in which the indication may not be applied, and may not apply the indication in those intervals, for example, if multiple DL HARQ processes are running in parallel.

In examples, the WTRU may not apply the indication, for example, if at least one DL HARQ retransmission timer is running. Not applying the indication may extend beyond not monitoring for a PDCCH transmission. Not applying the indication, as used herein, may include monitoring for the PDCCH transmission according to a reduced set of search spaces as described herein (e.g., a single preconfigured SS and/or the SS according to which the initial downlink grant is received).

SS group switching and/or PDCCH skipping may be applied in relation to UL retransmissions. In examples, a WTRU may receive a DCI with a downlink grant or an uplink grant and the DCI may include an indication for the WTRU to perform PDCCH skipping. The WTRU may apply the indication in slot (e.g., in a n+n_offset slot). For example, n may be a slot index in which the PDCCH transmission is received, and n_offset may be a configurable parameter in slots and maybe a function of WTRU capability. The WTRU may apply the indication in the first symbol after the end of the first transmission (e.g., within a bundle) of the corresponding PUSCH transmission (e.g., for an uplink grant).

In examples, the WTRU may choose not to apply PDCCH skipping in a duration (e.g., a time duration), e.g., to monitor PDCCH for possible retransmissions. The WTRU may monitor for a PDCCH transmission in the time duration, e.g., according to a possibly reduced set of SSs. The set of SSs may include a preconfigured set of SSs (e.g., including a single preconfigured SS). The set of SSs may include a set of SSs selected by the WTRU from the group of SSs the WTRU was monitoring and/or the WTRU is expected to monitor at the time the UL grant was received. For example, the set may contain one or more SSs from the group with the largest or smallest SS IDs. The set of SSs may be selected from the WTRU specific SSs (e.g., the WTRU specific SSs only). The set of SSs may include the SS according to which the uplink grant is received. The set of SSs may include the SS according to which an initial downlink grant (e.g., new data, not retransmission) is received. The set of SSs may include the SS according to which the uplink grant is received. The set of SSs may include the SS according to which an initial uplink grant is received (e.g., if the current grant is for a retransmission). The set of SSs may include a set of SSs selected by the WTRU from the set of all configured SSs for that BWP. For example, the set may contain one or more SSs from the group with the largest or smallest SS IDs. The set of SSs may be selected from the WTRU specific SSs (e.g., the WTRU specific SSs only).

In examples, the duration may include the symbols and slots during which a corresponding drx-RetransmissionTimerUL timer or one of a corresponding drx-RetransmissionTimerUL timer and a drx-HARQ-RTT-TimerUL timer is running. The corresponding timer(s) may be the timer(s) that are used for the HARQ process of a downlink grant. The WTRU may monitor for a PDCCH transmission with a reduced set of SSs, e.g., if at least one drx-RetransmissionTimerUL timer corresponding to any HARQ process is running. The WTRU may monitor for the PDCCH transmission with a reduced set of SSs, e.g., if at least one drx-RetransmissionTimerUL timer or at least one drx-HARQ-RTT-TimerUL timer corresponding to any HARQ process is running.

In examples, the WTRU may receive a DCI with a downlink grant and the DCI may include an indication for the WTRU to switch to a null state. The WTRU may switch to the null state and the WTRU may start a timer, e.g., a null_state_timer. If the data of the corresponding HARQ process is not successfully decoded, the WTRU may switch to a state (e.g., a new state) from the null state and/or the null_state_timer may be stopped. The WTRU may stay in the new state, e.g., if any the corresponding drx-RetransmissionTimerUL and drx-HARQ-RTT-TimerUL timers are running; or if the corresponding drx-RetransmissionTimerUL (e.g., only the corresponding drx-RetransmissionTimerUL) is running. The WTRU may stay in the new state, e.g., if at least one drx-RetransmissionTimerUL timer corresponding to any HARQ process is running. The WTRU may stay in the new state, e.g., if at least one drx-RetransmissionTimerUL or at least one drx-HARQ-RTT-TimerUL corresponding to any HARQ process is running. The new state may be a preconfigured state and/or the state in which the UL grant is received.

In examples, if the data of the corresponding HARQ process is not successfully decoded, the WTRU may ignore the PDCCH skipping indication and/or the switching to the null state indication and may continue to monitor the PDCCH according to the configured SSs.

Figure 9:
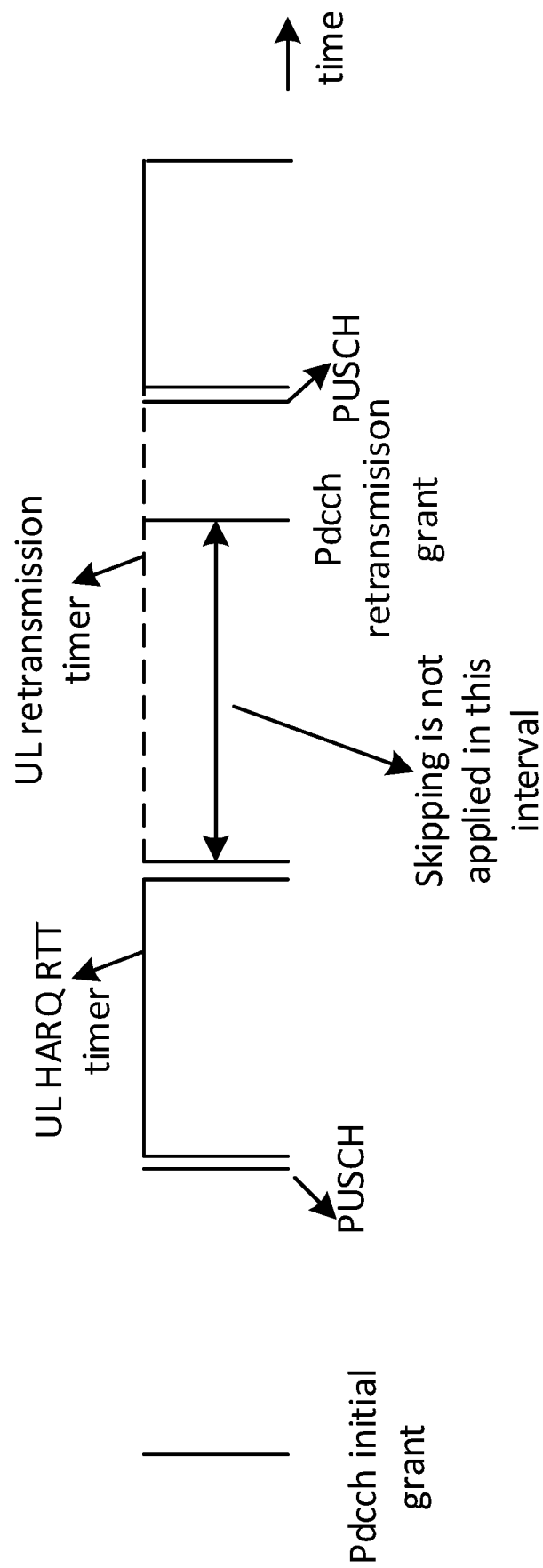
FIG. 9 is a diagram illustrating an example of a timeline for the uplink (UL) transmission of a corresponding HARQ process.

FIG. 9 is a diagram illustrating an example of a timeline for the UL transmission of a corresponding HARQ process. A HARQ uplink timer, such as the drx-HARQ-RTT-TimerUL timer for a HARQ process may be started in the first symbol in response to the end of the first transmission (e.g., within a bundle) of the corresponding PUSCH transmission and an UL retransmission timer, such as the drx-RetransmissionTimerUL timer for the corresponding HARQ process may be stopped, for example, if the PDCCH transmission indicates a UL transmission. The drx-RetransmissionTimerUL timer for the corresponding HARQ process may be started in the first symbol in response to the expiry of drx-HARQ-RTT-TimerUL, for example, if the drx-HARQ-RTT-TimerUL expires.

In examples, if the WTRU receives an indication not to monitor PDCCH in a time interval (e.g., a skipping indication, an indication to switch to a null state, etc.) in an initial grant, the WTRU may apply the indication, for example, if the UL retransmission timer is not running. The WTRU may start applying the indication in the first symbol in response to that the transmission carrying the grant ends (e.g., in response to that the PDCCH transmission with the grant ends), for example, if the UL retransmission timer is running and the WTRU receives a PDCCH transmission with a UL transmission grant (e.g., a retransmission grant).

The indication may not be applied in the interval from the first symbol when the UL retransmission timer is started until the last symbol of the transmission carrying the grant. In examples, the indication may not be applied in the interval from the first symbol when the UL retransmission timer is started until the last symbol of the transmission carrying the grant plus a time offset. The time offset may be configured and may be measured in terms of number of OFDM symbols and/or slots. In examples, the indication may not be applied in the interval from the first symbol when the UL retransmission timer is started until the end of the last symbol before the PUSCH transmission or until the end of the first transmission of the PUSCH transmission.

Although the timeline as shown in FIG. 9 is illustrated for a single UL HARQ process, multiple HARQ processes may be running in parallel. The WTRU may determine the applicable intervals for a UL HARQ process (e.g., each UL HARQ process), in which the indication may not be applied and may not apply the indication in those intervals.

In examples, the WTRU may not apply the indication, for example, if at least one UL HARQ retransmission timer is running. Not applying the indication may extend beyond not monitoring for a PDCCH transmission. Not applying the indication (e.g., as used herein) may include monitoring for the PDCCH transmission according to a reduced set of search spaces as described herein (e.g., a single preconfigured SS and/or or the SS according to which an initial downlink grant is received).

SS group switching and/or PDCCH skipping may be applied in relation to scheduling request (SR) transmission(s). In examples, the WTRU may be in a null state and may send a scheduling request (SR). The WTRU monitoring for a PDCCH transmission according to a first state may receive an indication to perform PDCCH skipping and/or switch to a null state. If the WTRU transmits a scheduling request if the WTRU is performing PDCCH skipping and/or in the null state, the WTRU may perform at least one of the following (e.g., after a time interval, which may be measured from the last symbol of the SR transmission). The WTRU may stop a null_state_timer and/or move to a state (e.g., a new state such as the state the WTRU was in before the null state, a preconfigured state, or a default state). The WTRU may monitor or resume monitoring for a PDCCH transmission according to the first state, a preconfigured state, or a default state (e.g., the default may be the search spaces belonging to the SS group with a lowest group ID or the search spaces belonging to the SS group with ID 0 or one specific search space). For example, the default state may be the SS with a smallest ID associated with SS group 0. The techniques described herein may similarly apply, for example, if the transmission is an SR, PRACH, or link recovery request (LRR). The time interval may be a minimum time during which the WTRU does not expect a response to the SR/PRACH/LRR transmission. The WTRU may monitor for the PDCCH transmission or resume monitoring for the PDCCH transmission according to a set of SSs (e.g., wherein the set of SSs may be determined from the SR resource configuration and/or the logical channel that triggered the SR), and/or a priority of the logical channel that triggered the SR and/or a PHY priority of the SR resource. For example, there may be two sets of SS groups configured to monitor after a SR transmission and the WTRU may choose which one to monitor, for example, based on the logical channel priority and/or the SR resource priority. For example, in the case of lower priority SR and/or lower priority logical channel, the WTRU may monitor for a PDCCH transmission according to a SS group with a smaller ID (e.g., ID 0). For example, in the case of higher priority SR and/or higher priority logical channel, the WTRU may monitor for a PDCCH transmission according to a SS group with a larger ID (e.g., ID 1). In examples, the WTRU may choose an SS (e.g., one SS) from the SS group. For example, in the case of lower priority SR and/or lower priority logical channel, the WTRU may monitor for a PDCCH transmission according to the SS with the smallest ID associated with SS group 0. For example, in the case of higher priority SR and/or higher priority logical channel, the WTRU may monitor for a PDCCH transmission according to the SS with the smallest ID associated with SS group 1.

In examples, the WTRU monitoring a PDCCH transmission according to a first state may receive an indication to perform PDCCH skipping in response to switching to a second state, e.g., in response to that the skipping duration ends. If the WTRU transmits an SR while performing PDCCH skipping, the WTRU may terminate the skipping operation (e.g., the WTRU may monitor or resume monitoring for a PDCCH transmission according to the current search space group) and may perform the indicated state switch (e.g., in response to the end of the skipping duration). The termination of the skipping operation may not change the timing of the state switching. The WTRU may monitor or resume monitoring for a PDCCH transmission (e.g., in response to a time interval measured from the last symbol of the SR transmission). In examples, in response to a time interval measured from the last symbol of the SR transmission, the WTRU may perform the indicated state switch.

SCell PDCCH monitoring adaptation may be implemented. A DCI transmission received in (e.g., via) a primary cell (Pcell) may indicate PDCCH monitoring adaptation in (e.g., for) one or more secondary cells (SCell)s. The adaptation may comprise search space set group (SSSG) switching and/or PDCCH skipping. The SCell PDCCH monitoring adaptation may use techniques/similar techniques as described herein. In examples, in the case of two-bits allocated in the DCI, each one of the four codepoints represented by the two bits may indicate SSSG switching and/or PDCCH skipping or the codepoint may be reserved.

A DCI (e.g., a DCI that is not used for data scheduling) may be received by the WTRU in (e.g., via) the Pcell. The DCI may be referred to as a non-scheduling DCI. The non-scheduling DCI may include bits that indicate the dormancy behavior of the SCells. In examples, one bit may indicate whether a dormant BWP or an active BWP in a SCell group may be used. In such a case, for each configured SCell group, e.g., in addition to the dormancy behavior, the DCI may include one or more additional bit(s) to indicate PDCCH monitoring adaptation. The monitoring adaptation used in the SCell may be a subset of the monitoring adaptation used in the Pcell. The monitoring adaption indicated in the Pcell may include one or more of the following configured codepoints. In the case of Pcell, 00 may indicate to switch to SSSG #0, 01 may indicate to switch to SSSG #1, 10 may indicate to skip $m_1$ slots, and/or 11 may indicate to skip m2 slots.

In the case of SCell group(s), the monitoring adaption indicated may be a subset of the configured codepoints for the Pcell (e.g., 00 may indicate to switch to SSSG #0 and 01 may indicate to switch to SSSG #1). In such a case, the WTRU may not expect to receive other codepoints (e.g., codepoints 10 and 11).

The PDCCH monitoring adaptation for the SCells may be indicated by one bit of the two bits in the DCI transmission. For example, the least significant bit (LSB) of the bits being 0 may indicate to switch to SSSG #0. The LSB of the bits being 1 may indicate to switch to SSSG #1.

The number of bits and/or codepoints used to indicate PDCCH monitoring adaptation may be configured separately for the Pcell and the Scells. In examples, in the case of the SCells, one bit may be configured to indicate one or more of the following: 0 may indicate to switch to SSSG #0 or 1 may indicate to switch to SSSG #1.

The bit(s) allocated to indicate dormancy behavior may be used to indicate PDCCH monitoring adaptation. In examples, if a dormant BWP is not configured, the bit configured to indicate dormancy behavior may be used to indicate switching to one of two SSSGs in an active BWP. In examples, if skipping is configured and/or indicated (e.g., also configured and/or indicated), one or more of the following may apply. If the WTRU is indicated to switch to the active BWP in a SCell group and no SSSG is configured in the BWP, the WTRU, e.g., in response to switching to the BWP, may apply skipping to applicable search spaces (e.g., all applicable search spaces) configured for the BWP (e.g., except one or more of the common search spaces). If the WTRU is indicated to switch to the active BWP in a SCell group and two or more SSSGs are configured in the BWP, the WTRU, e.g., in response to switching to the BWP, may monitor one of the SSSGs and may apply skipping to the monitored search spaces configured for the BWP (e.g., except one or more of the common search spaces). The SSSG to monitor may be preconfigured and/or predefined (e.g., the SSSG may be a default SSSG, such as SSSG #0). The WTRU may apply the skipping indication starting from the first symbol when the WTRU starts using the active BWP in the SCell. The WTRU may apply the skipping indication starting from the first symbol or the first slot after the last symbol of the first search space monitoring occasion in the active BWP.

If the WTRU is indicated to switch to the dormant BWP for a SCell group, the PDCCH monitoring indication bits may be ignored by the WTRU. The WTRU may determine (e.g., from an RNTI) that the received non-scheduling DCI transmission comprises bits that indicate PDCCH monitoring adaptation. The WTRU may not expect to receive a skipping indication, for example, if an indication to switch to an active BWP in a SCell group is received.

The skipping values and/or the values of timers configured for SSSGs may be configured per BWP in a SCell group, per SCell, and/or per SCell group. In examples, if the WTRU is indicated to switch to an active BWP in a SCell group and the WTRU is indicated to apply PDCCH monitoring in the BWP, skipping and/or timer values configured for the BWP may be used. If a value is not configured for the BWP, the WTRU may determine the value to use from the value(s) configured for the Pcell. The determined values may be the values configured for the PCell, which may be scaled by a subcarrier spacing. In examples, the subcarrier spacing configuration µ=0, 1, 2, 3 may correspond to subcarrier spacings 15 kHz, 30 kHz, 60 kHz, and 120 kHz, respectively. In such a case, the value for the Scell BWP may be determined by $(N/2^{\mu 0}) \times 2^{\mu 1}$, wherein µ0 and µ1 may be the subcarrier spacing configuration for the BWPs in the PCell and the SCell, respectively, and N may be the value configured for the BWP in the PCell.

In examples, if scheduling DCI is used, the WTRU may determine the PDCCH monitoring adaptation for the SCell group(s) from the adaptation indicated for the PCell. The WTRU may apply the same indication to both the PCell and the SCell. The WTRU may apply the same indication to the SCell, for example, if the indication indicates switching to a SSSG and if an SSSG with the same index is configured in the SCell. If the DCI transmission indicates to switch to SSSG #i in the PCell, the WTRU may switch to SSSG #i in the active BWP in a SCell (e.g., if the DCI transmission indicates to switch to the active BWP in the SCell). If an SSSG with the same index is not configured in the PCell and the SCell, the indication may be ignored by the WTRU. In some cases, the WTRU may not apply the same indication to both the PCell and the SCell. In examples, if the DCI indicates to skip PDCCH monitoring in the PCell, the WTRU may not apply the indication in the active BWP in a SCell (e.g., if the DCI indicates to switch to the active BWP in the SCell).

Systems, methods, and instrumentalities are described herein for a wireless transmit-receive unit (WTRU) configured to save power in active time. The WTRU may be configured to interpret one or more power saving bits in a downlink control information (DCI) (e.g., an indication of search space group switching and/or physical downlink control channel (PDCCH) skipping), for example, based on a WTRU state. The WTRU may be configured to receive a DCI via a PDCCH transmission. The DCI may include one or more power saving bits. The one or more power saving bits may include a power saving indication. The WTRU may determine a power saving action to be performed by the WTRU based on the power saving indication.

The WTRU may be configured to switch from a first search space group to the second search space group and monitor for a downlink transmission in accordance with the second search space group, for example, if the WTRU determines that the power saving action to be performed is switching to a second search space group.

The WTRU may be configured to skip monitoring for the downlink transmission in accordance with the first search space group, for example, if the WTRU determines that the power saving action to be performed is skipping monitoring for the downlink transmission.

The WTRU may be configured to handle retransmission and scheduling request handling if the WTRU receives a PDCCH skipping request. Based on the received PDCCH scheduling request the WTRU may not perform PDCCH skipping or may monitor PDCCH according to a reduced set of search spaces in a time window.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU) comprising:
a processor configured to:
receive, in a first search space (SS) group (SSG), a first downlink transmission, wherein the first downlink transmission comprises first configuration information associated with downlink transmission monitoring, and wherein the first configuration information indicates a first value associated with a first monitoring action;
monitor, in a second SSG in accordance with the first monitoring action indicated by the first value, for a second downlink transmission;
receive, in the second SSG, the second downlink transmission, wherein the second downlink transmission comprises second configuration information associated with downlink transmission monitoring, and wherein the second configuration information indicates a second value associated with a second monitoring action to be performed in the second SSG and a time duration; and
monitor, in the second SSG in accordance with the second monitoring action indicated by the second value, for a third downlink transmission, wherein the processor being configured to monitor, in the second SSG in accordance with the second monitoring action indicated by the second value, for the third downlink transmission comprises the processor being configured to:
skip downlink transmission monitoring in the second SSG for the time duration, and
in response to the time duration ending, monitor, in the second SSG, for the third downlink transmission.

2. The WTRU of claim 1, wherein the processor is further configured to:
receive, in the second SSG, the third downlink transmission, wherein the third downlink transmission comprises third configuration information associated with downlink transmission monitoring, and wherein the third configuration information indicates a third value associated with a third monitoring action; and
monitor, in the first SSG in accordance with the third monitoring action indicated by the third value, for a fourth downlink transmission.

3. The WTRU of claim 1, wherein the time duration is a first time duration, and wherein the processor is further configured to:

receive, in the second SSG, the third downlink transmission, wherein the third downlink transmission comprises third configuration information associated with downlink transmission monitoring, and wherein the third configuration information indicates a third value associated with a third monitoring action and a second time duration; and monitor, in the second SSG in accordance with the third monitoring action indicated by the third value, for a fourth downlink transmission, wherein the processor being configured to monitor, in the second SSG in accordance with the third monitoring action indicated by the third value, for the fourth downlink transmission comprises the processor being configured to:
  skip downlink transmission monitoring in the second SSG for the second time duration, and
  in response to the second time duration ending, monitor, in the second SSG, for the fourth downlink transmission.

4. The WTRU of claim 1, wherein the processor is further configured to receive, in the second SSG, the third downlink transmission, wherein the third downlink transmission comprises third configuration information associated with downlink transmission monitoring, wherein the third configuration information indicates a third value associated with a third monitoring action, and wherein the third monitoring action indicates for the WTRU to skip monitoring for a remainder of a discontinuous reception (DRX) cycle.

5. The WTRU of claim 1, wherein the time duration is a first time duration, and wherein the processor is further configured to:
  receive, in the second SSG, the third downlink transmission, wherein the third downlink transmission comprises third configuration information associated with downlink transmission monitoring, and wherein the third configuration information indicates a third value associated with a third monitoring action;
  transition to monitoring, in the first SSG in accordance with the third monitoring action indicated by the third value, for a fourth downlink transmission;
  receive, in the first SSG, the fourth downlink transmission;
  monitor, in the first SSG in accordance with the third monitoring action indicated by the third value, for a fifth downlink transmission;
  determine that a second time duration has elapsed since the WTRU transitioned to monitoring in the first SSG; and
  based on the second time duration elapsing, transition to the second SSG.

6. The WTRU of claim 1, wherein the first downlink transmission is a physical downlink control channel (PDCCH) transmission, the first configuration information is indicated in downlink control information (DCI), and the first configuration information is associated with power saving.

7. The WTRU of claim 1, wherein the second configuration information is associated with power saving, and the time duration is an interval of time, slots, orthogonal frequency division multiplexing (OFDM) symbols, or monitoring occasions.

8. The WTRU of claim 1, wherein the first value is implicitly indicated based on at least one of:
  a control resource set (CORESET) in which the first downlink transmission is received;
  a radio network temporary identifier (RNTI) used to scramble cyclic redundancy check (CRC) information associated with the first downlink transmission;
  a bandwidth part type associated with the first downlink transmission; or
  a downlink control information (DCI) format associated with the first downlink transmission.

9. The WTRU of claim 1, wherein the processor is further configured to:
  receive, in the second SSG, the third downlink transmission, wherein the third downlink transmission comprises third configuration information associated with downlink transmission monitoring, and wherein the third configuration information indicates a third value associated with a third monitoring action; and
  monitor, in the second SSG in accordance with the third monitoring action, for a fourth downlink transmission, wherein the processor being configured to monitor in accordance with the third monitoring action comprises the processor being configured to monitor in the second SSG based on a monitoring periodicity.

10. A method, performed by a wireless transmit/receive unit (WTRU) comprising:
  receiving, in a first search space (SS) group (SSG), a first downlink transmission, wherein the first downlink transmission comprises first configuration information associated with downlink transmission monitoring, and wherein the first configuration information indicates a first value associated with a first monitoring action;
  monitoring, in a second SSG in accordance with the first monitoring action indicated by the first value, for a second downlink transmission;
  receiving, in the second SSG, the second downlink transmission, wherein the second downlink transmission comprises second configuration information associated with downlink transmission monitoring, and wherein the second configuration information indicates a second value associated with a second monitoring action and a time duration; and
  monitoring, in the second SSG in accordance with the second monitoring action indicated by the second value, for a third downlink transmission, wherein monitoring, in the second SSG in accordance with the second monitoring action indicated by the second value, for the third downlink transmission comprises:
    skipping downlink transmission monitoring in the second SSG for the time duration, and
    in response to the time duration ending, monitoring, in the second SSG, for the third downlink transmission.

11. The method of claim 10, wherein the method further comprises:
  receiving, in the second SSG, the third downlink transmission, wherein the third downlink transmission comprises third configuration information associated with downlink transmission monitoring, and wherein the third configuration information indicates a third value associated with a third monitoring action; and
  monitoring, in the first SSG in accordance with the third monitoring action indicated by the third value, for a fourth downlink transmission.

12. The method of claim 10, wherein the time duration is a first time duration, and wherein the method further comprises:
  receiving, in the second SSG, the third downlink transmission, wherein the third downlink transmission comprises third configuration information associated with downlink transmission monitoring, and wherein the third configuration information indicates a third value associated with a third monitoring action and a second time duration; and monitoring, in the second SSG in accordance with the third monitoring action indicated by the third value, for a fourth downlink transmission, wherein monitoring, in the second SSG in accordance with the third monitoring action indicated by the third value, for the fourth downlink transmission comprises:
- skipping downlink transmission monitoring in the second SSG for the second time duration, and
- in response to the second time duration ending, monitoring, in the second SSG, for the fourth downlink transmission.

13. The method of claim 10, wherein the method further comprises receiving, in the second SSG, the third downlink transmission, wherein the third downlink transmission comprises third configuration information associated with downlink transmission monitoring, wherein the third configuration information indicates a third value associated with a third monitoring action, and wherein the third monitoring action indicates for the WTRU to skip monitoring for a remainder of a discontinuous reception (DRX) cycle.

14. The method of claim 10, wherein the method further comprises:
- receiving, in the second SSG, the third downlink transmission, wherein the third downlink transmission comprises third configuration information associated with downlink transmission monitoring, and wherein the third configuration information indicates a third value associated with a third monitoring action;
- transitioning to monitoring, in the first SSG in accordance with the third monitoring action indicated by the third value, for a fourth downlink transmission;
- starting a timer upon transitioning to monitoring in the first SSG;
- receiving, in the first SSG, the fourth downlink transmission;
- monitoring, in the first SSG in accordance with the third monitoring action indicated by the third value, for a fifth downlink transmission;
- determining that the timer has expired; and
- based on the timer expiring, transitioning to the second SSG.

15. The method of claim 10, wherein the first downlink transmission is a physical downlink control channel (PDCCH) transmission, the first configuration information is indicated in downlink control information (DCI), and the first configuration information is associated with power saving.

16. The method of claim 10, wherein the second configuration information is associated with power saving, and the time duration is an interval of time, slots, orthogonal frequency division multiplexing (OFDM) symbols, or monitoring occasions.

17. The method of claim 10, wherein the first value is implicitly indicated based on at least one of:
- a control resource set (CORESET) in which the first downlink transmission is received;
- a radio network temporary identifier (RNTI) used to scramble cyclic redundancy check (CRC) information associated with the first downlink transmission;
- a bandwidth part type associated with the first downlink transmission; or
- a downlink control information (DCI) format associated with the first downlink transmission.

18. The method of claim 10, wherein the method further comprises:
- receiving, in the second SSG, the third downlink transmission, wherein the third downlink transmission comprises third configuration information associated with downlink transmission monitoring, and wherein the third configuration information indicates a third value associated with a third monitoring action; and
- monitoring, in the second SSG in accordance with the third monitoring action, for a fourth downlink transmission, wherein monitoring in accordance with the third monitoring action comprises monitoring in the second SSG based on a monitoring periodicity.

\* \* \* \* \*